United States Patent
Kondo et al.

(10) Patent No.: US 6,646,684 B1
(45) Date of Patent: Nov. 11, 2003

(54) IMAGE CONVERSION DEVICE AND METHOD

(75) Inventors: Tetsujiro Kondo, Tokyo (JP); Yasushi Tatehira, Kanagawa (JP); Masaaki Hattori, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/720,348
(22) PCT Filed: Apr. 21, 2000
(86) PCT No.: PCT/JP00/02636
§ 371 (c)(1),
(2), (4) Date: Dec. 21, 2000
(87) PCT Pub. No.: WO00/65830
PCT Pub. Date: Nov. 2, 2000

(30) Foreign Application Priority Data

Apr. 23, 1999 (JP) .................................. 11-116806

(51) Int. Cl.[7] .......................... H04N 7/01; H04N 11/20
(52) U.S. Cl. ..................... 348/447; 348/457; 348/449; 348/558
(58) Field of Search ................................. 348/441, 447, 348/449, 457, 458, 459, 554, 555, 556, 558, 910, 911; H04N 7/01, 11/20

(56) References Cited

U.S. PATENT DOCUMENTS

| | | | | |
|---|---|---|---|---|
| 4,937,667 A | * | 6/1990 | Choquet et al. ............. 348/448 |
| 5,132,793 A | * | 7/1992 | Hirahata et al. ............. 348/556 |
| 5,461,420 A | * | 10/1995 | Yonemitsu et al. ..... 375/240.15 |
| 5,666,164 A | * | 9/1997 | Kondo et al. ................ 348/441 |
| 5,748,235 A | * | 5/1998 | Kondo et al. ............. 348/222.1 |
| 5,852,470 A | * | 12/1998 | Kondo et al. ................ 348/448 |
| 5,946,044 A | * | 8/1999 | Kondo et al. ................ 348/458 |
| 5,966,183 A | * | 10/1999 | Kondo et al. ................ 348/458 |
| 6,057,885 A | * | 5/2000 | Horishi et al. ............... 348/450 |
| 6,307,560 B1 | * | 10/2001 | Kondo et al. ................ 345/619 |
| 6,323,905 B1 | * | 11/2001 | Kondo et al. ................ 348/441 |
| 6,356,310 B1 | * | 3/2002 | Horishi et al. ............... 348/458 |
| 6,377,307 B1 | * | 4/2002 | Honda ......................... 348/448 |
| 6,414,717 B1 | * | 7/2002 | Kondo et al. ................ 348/441 |
| 6,433,828 B1 | * | 8/2002 | Kondo et al. ................ 348/458 |
| 6,466,269 B1 | * | 10/2002 | Someya et al. ............. 348/448 |
| 6,483,545 B1 | * | 11/2002 | Kondo et al. ................ 348/448 |
| 6,483,546 B1 | * | 11/2002 | Kondo et al. ................ 348/458 |

FOREIGN PATENT DOCUMENTS

| | | |
|---|---|---|
| JP | 2-112392 | 4/1990 |
| JP | 2-127884 | 5/1990 |
| JP | 2-198286 | 8/1990 |
| JP | 6-217264 | 8/1994 |
| JP | 7-30859 | 1/1995 |

* cited by examiner

Primary Examiner—John Miller
Assistant Examiner—Brian Yenke
(74) Attorney, Agent, or Firm—Frommer Lawrence & Haug LLP; William S. Frommer

(57) ABSTRACT

One of an output picture signal with a field double speed of AABB type and an output picture signal with a field double speed of ABAB type is selectively generated with selection signals SL1 and SL2. In the AABB type, among first, second, third, and fourth output fields, the vertical pixel position of the second output field is the same as the vertical pixel position of the first output field. In addition, the vertical pixel position of the fourth output field is the same as the vertical pixel position of the third output field. In the ABAB type, among first, second, third, and fourth output fields that are chronologically successive, the vertical pixel position of the second output field deviates from the vertical pixel position of the first output field. In addition, the vertical pixel position of the third output field deviates from the vertical pixel position of the second output field. The vertical pixel position of the fourth output field deviates from the vertical pixel position of the third output field.

24 Claims, 17 Drawing Sheets

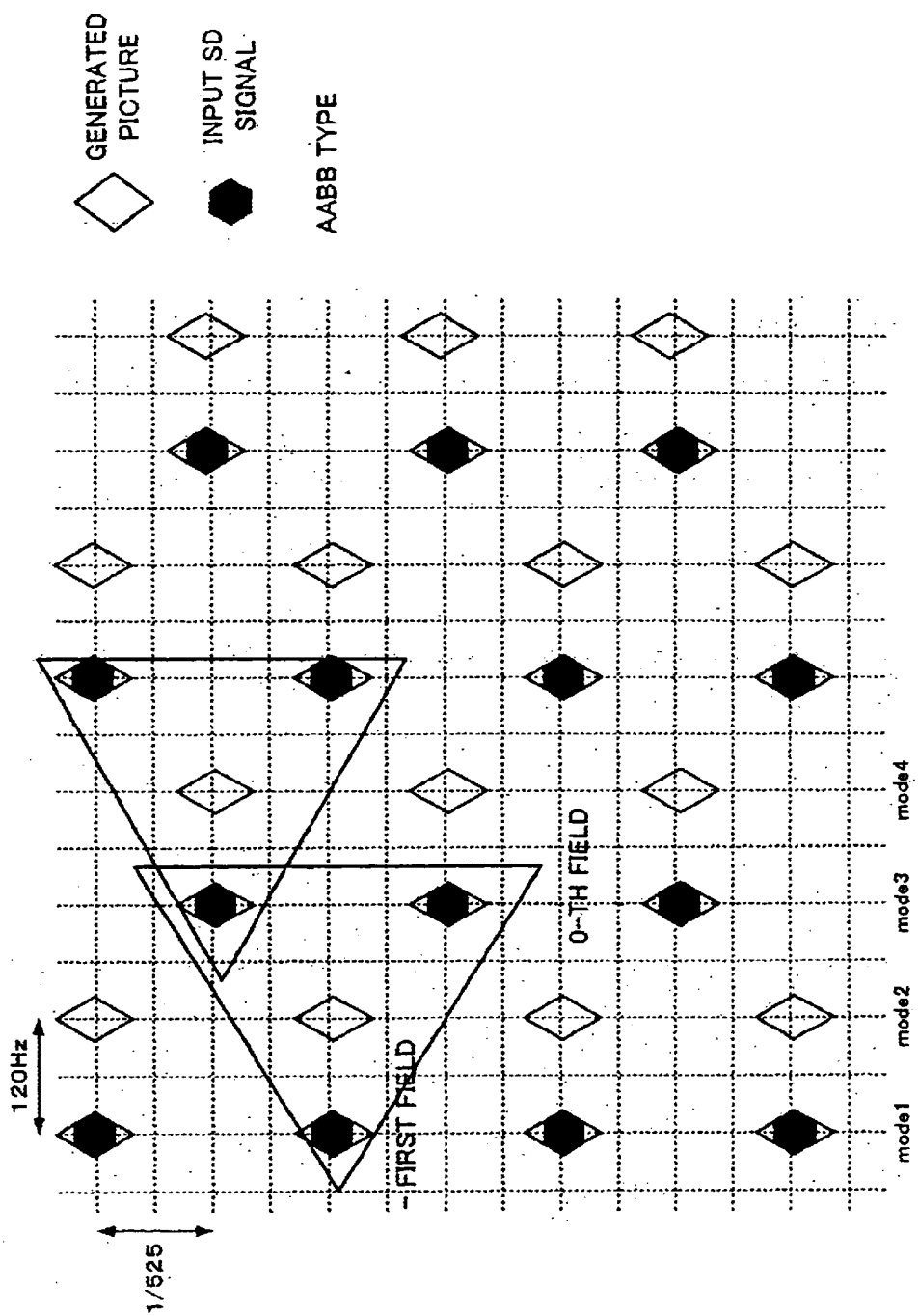

Fig. 8A
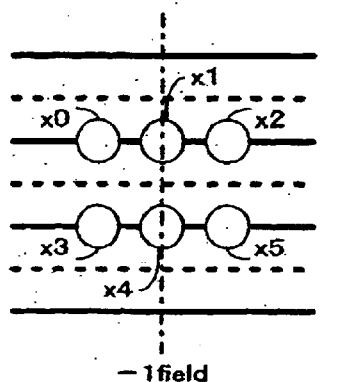 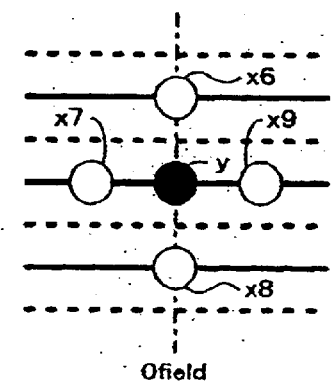
EXAMPLE OF PREDICTIVE TAPS (MODE 1 AND 3)
Fig. 8B
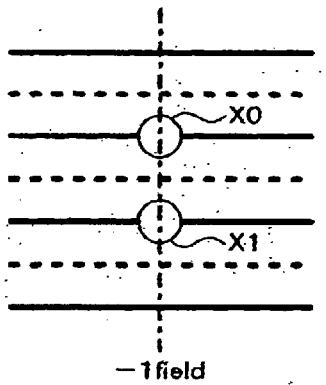 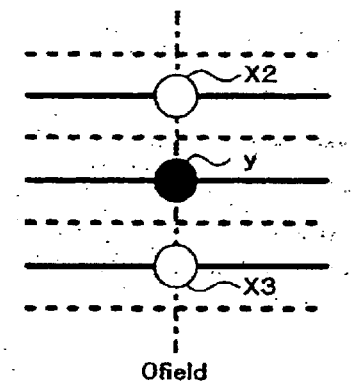
EXAMPLE OF CLASS TAPS (MODE 1 AND 3)

PREDICTIVE TAPS (MODE 2 AND 4)

CLASS TAPS (MODE 2 AND 4)

PREDICTIVE TAPS (MODE 2)

CLASS TAPS (MODE 2)

PREDICTIVE TAPS (MODE 3)

CLASS TAPS (MODE 3)

PREDICTIVE TAPS (MODE 4)

CLASS TAPS (MODE 4)

ABAB TYPE

AABB TYPE

○ INPUT PIXEL
● OUTPUT PIXEL
✡ POINT GENERATED BY MEDIAN FILTER

ND METHOD

TECHNICAL FIELD

The present invention relates to a picture converting apparatus and a method thereof suitable for use with a television receiver, a VTR, and so forth.

RELATED ART

Conventionally, as television scanning field frequencies, 50 Hz (for PAL system and SECAM system) or 60 Hz (for NTSC system) have been widely used. When the field frequency is relatively low—for example 50 Hz, a so-called flicker of which a large area of the display screen flickers takes place.

To suppress the field flicker, an apparatus that doubles the number of fields of an input picture signal is known. Such a process is referred to as field double speed process. FIG. 17 shows one example and another example of the pixel structure obtained by the field double speed process. In FIG. 17, the vertical axis represents vertical position V, whereas the horizontal axis represents time t. As the result of the field double speed process, an output picture signal having a 1/2 field period of an input picture signal is formed. Since the input picture signal is an interlaced signal, the vertical position (line position) of an input pixel (denoted by a white circle) of one field deviates by 1/2 between from that of the chronologically adjacent field.

The pixel structure shown in FIG. 17A is obtained by performing a double speed process in such a manner that double speed fields of an output picture signal are interlaced. Conventionally, to form output pixels of a field that are not present in an input picture signal, three pixels of the input picture signal are supplied to a median filter. In FIG. 17A, an output pixel (denoted by a star mark) is generated by the median filter with three input pixels placed in a triangular area denoted by dotted lines. The median filter outputs a pixel value that has the median pixel values of the three input pixels. FIG. 17A shows the process of the median filter for a part of output pixels. The median filter generates all output pixels other than those that match the positions of the input pixels. An output picture signal having the pixel structure shown in FIG. 17A is referred to as ABAB type.

On the other hand, in the pixel structure of an output picture signal shown in FIG. 17B, a double speed process is performed in such a manner that pixels of a new field are present at the same vertical positions as those of the chronologically early field of the input picture signal. In FIG. 17B, by repeatedly outputting the chronologically early field, the double speed process can be performed. An output picture signal having the pixel structure shown in FIG. 17B is referred to as AABB type.

In the AABB type, since the same field is repeatedly output, the double speed process does not improve the resolution in the chronological direction. Instead, when a picture is panned by a video camera, a dual picture takes place. Thus, the resultant picture quality may deteriorate. The ABAB type is advantageous against the AABB type with respect to the chronological and spatial resolutions (resolutions in the chronological direction and in the spatial resolution). However, in the ABAB type, three input pixels contained in chronologically early and late fields are processed by a median filter so that an output pixel is interpolated. Thus, when all the screen moves (for example, characters are horizontally scrolled), a vertical line looks like a comb. For example, when numeric characters and alphabetic characters are horizontally scrolled (such as stock information), their visibility deteriorates.

DISCLOSURE OF THE INVENTION

Therefore, an object of the present invention is to provide a picture converting apparatus and a method thereof that allow low chronological and spatial resolutions as a problem of the AABB type to be solved.

Another object of the present invention is to provide a picture converting apparatus and a method thereof that allow the ABAB type or the AABB type to be selected corresponding to the pattern of an input picture so as to impose the picture quality thereof.

To solve the above-described problem, the invention of claim 1 is a picture converting apparatus for converting an input picture signal into an output picture signal, the pixel position of a first field of the input picture signal being different from the pixel position of a second field thereof, the first field being adjacent to the second field, the field frequency of the output signal being N times higher than the field frequency of the input picture signal, where N is an integer that is 2 or larger, comprising:

a class deciding portion for designating each of all fields of the output picture signal that are not present in at least the input picture signal to a considered field and deciding a class for each considered pixel of each considered field corresponding to a plurality of pixels of the input picture signal, the plurality of pixels being decided corresponding to each considered pixel of the considered field, a memory portion for storing pre-obtained predictive information, a predictive pixel selecting portion for selecting a plurality of pixels of the input picture signal for each considered pixel, and a pixel generating portion for generating each considered pixel of the output picture signal corresponding to predictive information for a class decided by the class deciding portion and a plurality of pixels selected by the predictive pixel selecting portion, wherein the pixel position of the output picture signal varies at intervals of fields equal to N, and wherein the pixel position of each field matches the pixel position of the first field or the second field of the input picture signal.

In addition, the invention of claim 13 is a picture converting method for converting an input picture signal into an output picture signal, the pixel position of a first field of the input picture signal being different from the pixel position of a second field thereof, the first field being adjacent to the second field, the field frequency of the output signal being N times higher than the field frequency of the input picture signal, where N is an integer that is 2 or larger, comprising the steps of:

designating each of all fields of the output picture signal that are not present in at least the input picture signal to a considered field and deciding a class for each considered pixel of each considered field corresponding to a plurality of pixels of the input picture signal, the plurality of pixels being decided corresponding to each considered pixel of the considered field, selecting a plurality of pixels of the input picture signal for each considered pixel, and generating each considered pixel of the output picture signal corresponding to predictive information for a class decided at the class deciding step and a plurality of pixels selected at the predictive pixel selecting step, wherein the pixel position of the output picture signal varies at intervals of fields equal to N, and wherein the pixel position of each field matches the pixel position of the first field or the second field of the input picture signal.

According to the present invention, when an output picture signal of AABB type is generated, a pixel value of an output field that is not present in an input picture signal is generated by a class categorizing adaptive process with picture information of input fields that are immediately early and late input fields thereof, in comparison with a conventional method for simply repeatedly outputting the same field, a field that is output second time has picture information corresponding to the output time. Thus, a problem of the AABB type that does not have a chronological resolution can be solved. In the class categorizing adaptive process, a class is detected with a plurality of pixels of an input picture signal. With an estimating predicting expression that is optimum for the detected class, a pixel value of an output picture signal is generated. Thus, in comparison with the case that a pixel is interpolated with a median filter, the resolution of the output picture signal can be improved.

In addition, as a result of the speed double speed process, an output picture signal of AABB type and an output picture signal of ABAB type can be selectively generated. Thus, when an input picture signal contains a pattern that requires chronological and spatial resolutions, the ABAB type is selected. In contrast, when telops that horizontally move are often displayed, the AABB type can be selected.

BRIEF DESCRIPTION OF THE DRAWINGS

FIG. 7 is a schematic diagram showing the tap structure in the case that an output signal of AABB type is generated.

FIG. 8 is a schematic diagram showing an example of predictive taps and class taps of the AABB type.

BEST MODES FOR CARRYING OUT THE INVENTION

Next, a first embodiment of the present invention will be described. A field double speed processing apparatus according to the first embodiment generates a pixel of an output field that is not present in at least an input picture signal by a class categorizing adaptive process. First of all, with reference to FIG. 1, a field double speed process for generating an output picture signal of AABB type according to the present invention will be described. As with FIG. 17, FIG. 1 shows a pixel structure obtained by the field double speed process. In FIG. 1, the vertical axis represents a vertical position v, whereas the horizontal axis represents a time t. In FIG. 1, an input picture is represented with a white circle, whereas an output picture is represented with a black circle or a stair mark.

Figure 1B:
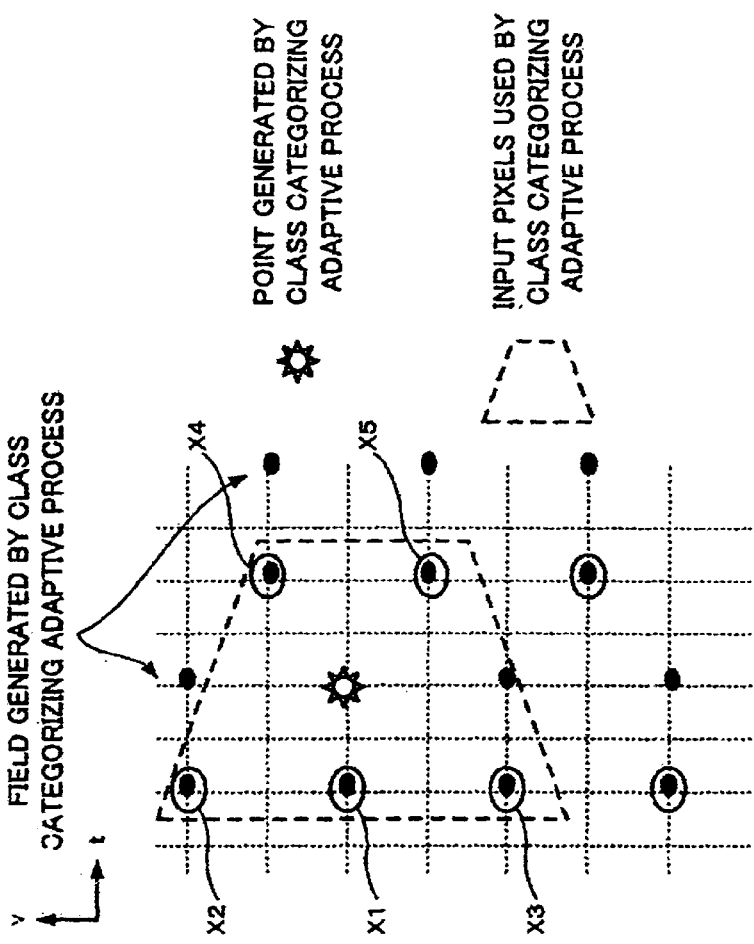
FIG. 1 is a schematic diagram showing the pixel structure for explaining a first embodiment of the present invention.
Figure 1A:
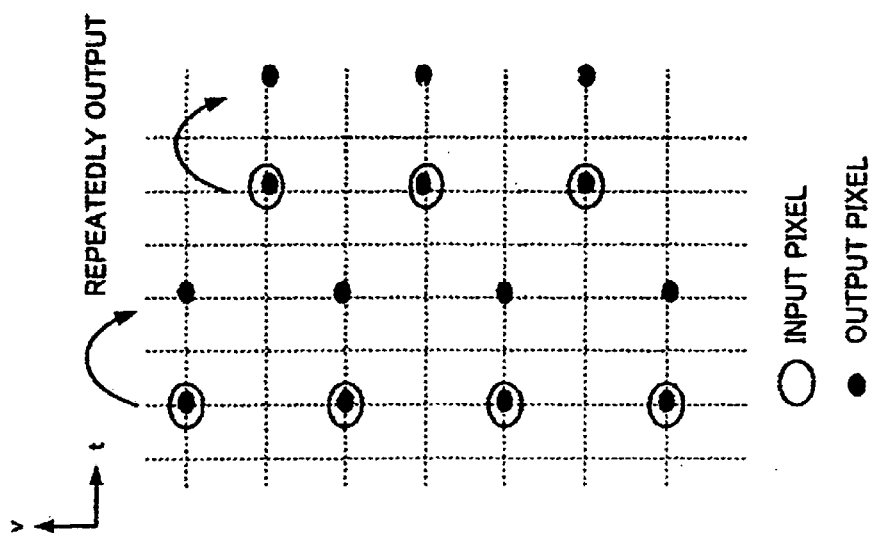
Figure 17A:
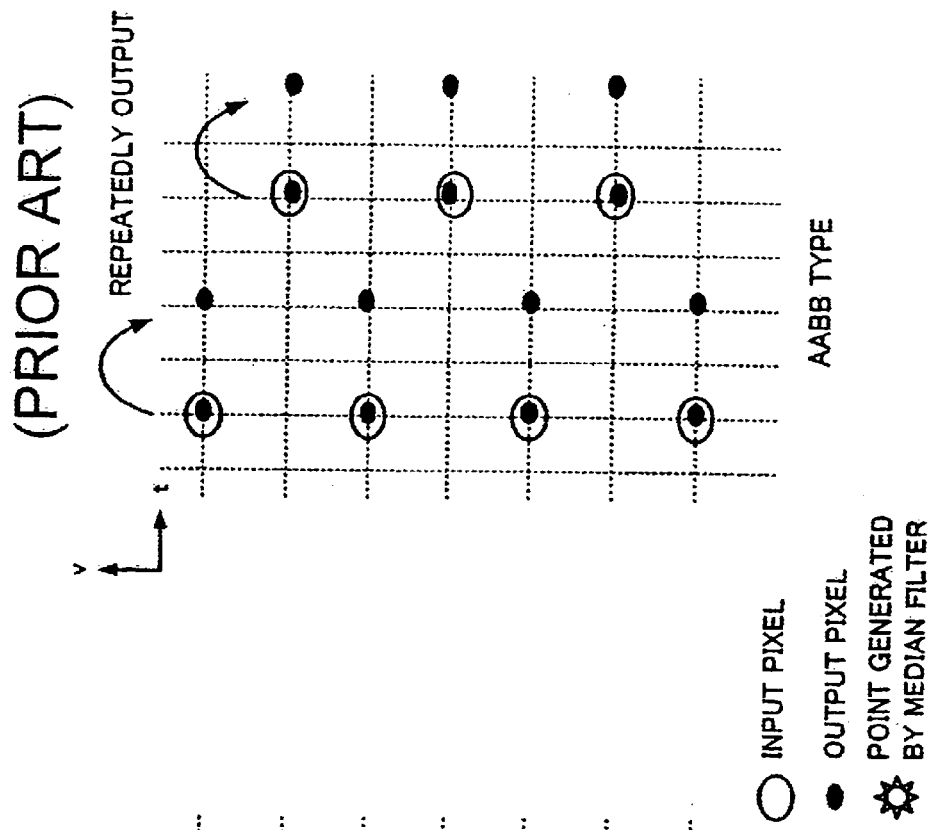
FIG. 17 is a schematic diagram for explaining one example and another example of the conventional field double speed process.
Figure 17B:
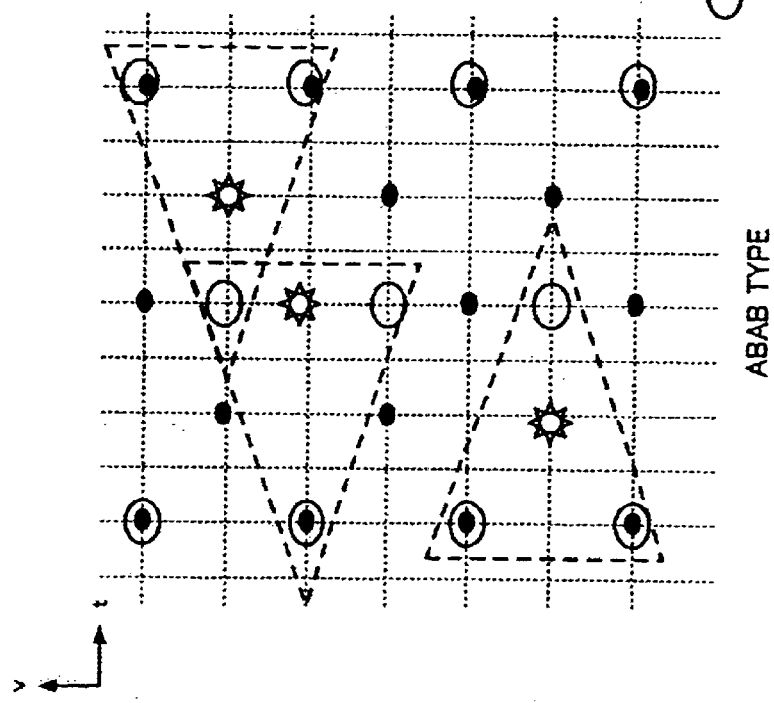

FIG. 1A shows a conventional process as with FIG. 17A in comparison with a process according to the present invention. In other words, by repeatedly outputting the field of an input picture signal, the double speed process is performed. FIG. 1B shows a double speed process according to the present invention. In FIG. 1B, as denoted by an area surrounded by dotted lines, with a pixel x1 that is contained in the chronologically early field of a field that is not present in an input picture signal (this field is referred to as new field) and that is placed at the same vertical position, pixels x2 and x3 that are placed at the immediately upper and lower positions of the pixel x1, and pixels x4 and x5 that are contained in the immediately late field and that are placed at the vertically upper and lower positions of the pixel x1, a pixel y of the new field is generated. This process is referred to as class categorizing adaptive process. As will be clear from the description of a second embodiment that follows, input pixels used in the class categorizing adaptive process are not limited to pixels x1 to x5.

According to the first embodiment of the present invention, as shown in FIG. 1B, with input pixels of a chronologically early input field and a chronologically late input field, an output pixel of a new field is generated by the class categorizing adaptive process. Thus, a new field of AABB type with a chronological resolution can be generated. As a result, unlike with the conventional method of which the same field is repeatedly output, a patterned picture is free from a twin image.

Next, a second embodiment of the present invention will be described. According to the second embodiment, an input picture signal is an interlaced signal having a field frequency of 60 Hz and 525 lines. The input picture signal is converted into an output picture signal having a field frequency of 120 Hz and 525 lines by the field double speed process. In addition, according to the second embodiment, as a picture structure of the output picture signal, the AABB type or the ABAB type can be selected by a user's setup operation or corresponding to an input picture signal. When a picture signal of AABB type is output, a pixel is generated corresponding to the method described with reference to FIG. 1B. Likewise, when a picture signal of ABAB type is output, a pixel is generated by the class categorizing adaptive process. Thus, since the class categorizing adaptive process is applied for the ABAB type, higher chronological and spatial resolutions can be accomplished in comparison with the conventional method using a median filter.

In the class categorizing adaptive process, a picture signal as an input signal is categorized as a class corresponding to chronological and/or spatial characteristics. A storing means that stores pre-learnt predictive coefficient values for individual classes is disposed. Corresponding to a calculation based on a predicting expression, an optimally estimated value is output. By the class categorizing adaptive process, a higher resolution than that of the input picture signal can be accomplished.

Figure 2:
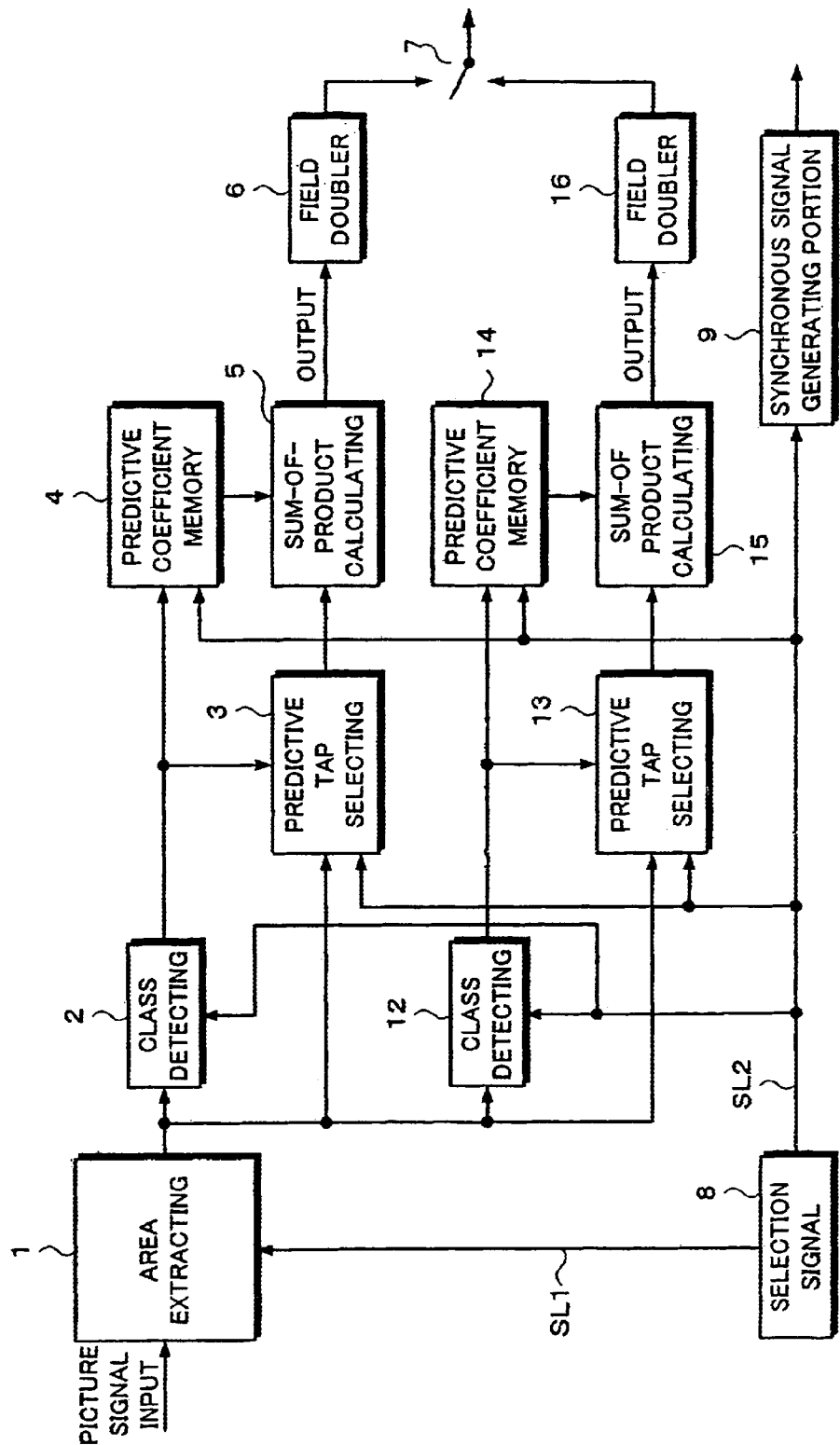
FIG. 2 is a block diagram showing a second embodiment of the present invention.

In an example of the pixel generating apparatus, as shown in FIG. 2, an input interlaced picture signal (525 lines/60 Hz) is supplied to an area extracting portion 1. The area extracting portion 1 extracts an area containing a plurality of pixels necessary for class categorizing and predicting calculations. An output of the area extracting portion 1 is supplied to class detecting circuits 2 and 12 and predictive tap selecting circuits 3 and 13. The class detecting circuits 2 and 12 detect classes corresponding to features of input pixels in the vicinities of output pixels to be generated. Alternatively, the class detecting circuits 2 and 12 may detect moving classes. The reason why two structures for generating pixels in parallel is in that the first structure is used to generate a pixel of a field that is present in an input picture signal and the second structure is used to generate a pixel of a field that is not present in the input picture signal.

Classes detected by the class detecting circuits 2 and 12 are supplied to the predictive tap selecting circuits 3 and 13 and predictive coefficient memories 4 and 14, respectively. Predictive coefficient sets corresponding to the classes are read from the predictive coefficient memories 4 and 14. The predictive coefficient sets are supplied to sum-of-product calculating circuits 5 and 15, respectively. The predictive tap selecting circuits 3 and 13 select predictive taps corresponding to the classes. When predictive coefficient sets of individual class are pre-learnt, both the predictive coefficient sets and predictive tap position information are obtained at a time. The predictive tap selecting circuits 3 and 13 have respective memories that store predictive tap position information for individual classes. The predictive tap position information that is read corresponding to classes from the memories is supplied to a tap switching selector. The selector selectively outputs predictive taps. Predictive taps are output from the predictive tap selecting circuits 3 and 13 to the sum-of-product calculating circuits 5 and 15.

The sum-of-product calculating circuits 5 and 15 calculate data of output picture signals with linear estimating expressions of predictive taps (pixels of an input picture signal) and predictive coefficient sets. The sum-of-product calculating circuits 5 and 15 output a first pixel value and a second pixel value of adjacent fields of an output picture signal having a field double speed, respectively. The first pixel value is supplied from the sum-of-product calculating circuit 5 to a field doubler 6. The second pixel value is supplied form the sum-of-product calculating circuit 15 to a field doubler 16. The field doublers 6 and 16 have respective field memories and double the field frequencies of the first field and the second field, respectively. Outputs of the field doublers 6 and 16 are selected for each field and input to a selector 7. The selector 7 alternately selects the outputs of the field doublers 6 and 16 for each field. As a result, the selector 7 generates an output picture signal (an output signal having 525 lines and a field frequency of 120 Hz).

The output picture signal is supplied to for example a CRT display (not shown). The CRT display has a synchronous system that allows the output picture signal to be displayed. The input picture signal is for example a broadcast signal or a reproduction signal of a reproducing apparatus such as a VTR. In other words, this example can be disposed in a television receiver.

The pixel generating apparatus further comprises a selection signal generating portion 8. The selection signal generating portion 8 generates selection signals SL1 and SL2 that cause an output picture signal of AABB type and an output picture signal ABAB to be generated, respectively. The high level and low level of the selection signals SL1 and SL2 correspond to the AABB type and the ABAB type, respectively. The selection signal generating portion 8 generates the selection signals SL1 and SL2 corresponding to a manual operation of the user who operates a predetermined switch or the like while seeing a picture displayed corresponding to the output picture signal. Instead of the manual operation, the selection signal generating portion 8 may generate the selection signals SL1 and SL2 corresponding to a control signal transmitted along with the input picture signal. As another alternative method, the selection signal generating portion 8 may automatically generate 1 the selection signals SL1 and S2 corresponding to characteristics of the input picture signal.

The extracting method of the area extracting portion 1 is controlled corresponding to the selection signal SL1. The selection signal SL2 causes the class detecting circuits 2 and 12 to designate class taps and the predictive tap selecting circuits 3 and 13 to designate predictive taps. In addition, the selection signal SL2 causes the predictive coefficient tables of the predictive coefficient memories 4 and 14 to be selected. Moreover, the selection signal SL2 is supplied to a synchronous signal generating portion 9. The synchronous signal generating portion 9 generates a vertical synchronous signal corresponding to the type of the output picture signal. The vertical synchronous signal controls the vertical deflection of a CRT monitor (not shown).

FIG. 3 shows the relation between addresses of the field memories of the field doublers 6 and 16 and time as operations of the field doublers 6 and 16. In FIG. 3, the horizontal axis represents the time, whereas the horizontal axis represents the addresses. The sum-of-product calculating circuits 5 and 15 generate data of the first field and data of the second field at the same time. FIG. 3A shows addresses of which the picture signal of the first field generated by the sum-of-product calculating circuit 5 is written to the field memory. FIG. 3 shows addresses of which the picture signal of the second field generated by the sum-of-product calculating circuit 15 is written to the field memory. Numbers 1A, 1B, 2A, 2B, . . . each represent two fields (A and B) that compose one frame. Ignoring a delay of the class categorizing adaptive process, the input picture signal and the output picture signals of the sum-of-product calculating circuits 5 and 15 are assigned numbers.

Figure 3A:
FIG. 3 is a waveform chart for explaining a field double speed process.
Figure 3B:
Figure 3C:
Figure 3D:

The output picture signal of the sum-of-product calculating circuit 5 shown in FIG. 3A is supplied to the field doubler 6. One field (for example, 1A shown in FIG. 3A) of the output of the sum-of-product calculating circuit 5 is written to the field memory of the field doubler 6. One field (for example, 1A shown in FIG. 3B) is read from the field memory at a speed twice as high as the write speed in such a manner that the read address does not exceed the write address. In addition, one field is read twice. Thus, as shown in FIG. 3B, an output having a double field frequency is generated by the field doubler 6. As with the field doubler 6, the field doubler 16 generates an output signal of which the field frequency of the calculated signal of the sum-of-product calculating circuit 15 is doubled (see FIG. 3D).

Figure 3E:

The output signals of the field doublers 6 and 16 are supplied to the selector 7. The selector 7 alternately selects the output signals for each field. As a result, an output picture signal shown in FIG. 3E is obtained from the selector 7. The output picture signal is composed of a picture signal of the first field generated by the sum-of-product calculating circuit 5 and a picture signal of the second field generated by the sum-of-product calculating circuit 15, these picture signals being alternately placed on the time base, the field frequency being doubled.

The structure for accomplishing the field double speed process in the class categorizing adaptive process shown in FIG. 2 corresponds to one component of a color picture signal. However, it should be noted that the structure shown in FIG. 2 may be used for each of three components of a luminance signal and two color difference signals. As well as the component color picture signal, the present invention can be applied to a composite color picture signal.

FIG. 4 is a schematic diagram for explaining a vertical synchronous signal generated by the synchronous signal generating portion 9. When the output picture signal is of ABAB type, as shown in FIG. 4A, the signal is interlaced and raster-scanned. In other words, lines are scanned from the first line of the first field as denoted by solid lines. In the middle of the 263-rd line, the second field is scanned until the 525-th line. A line of the second field is placed between two adjacent lines of the first field. Thus, as shown in FIG. 4B, in the ABAB type, a vertical synchronous signal having a frequency of 262.5 lines is generated by the synchronous signal generating portion 9.

Figure 4A:
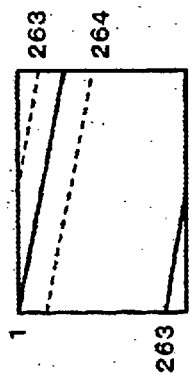
FIG. 4 is a schematic diagram for explaining a vertical synchronous signal against an output picture signal of the field double speed process.
Figure 4B:
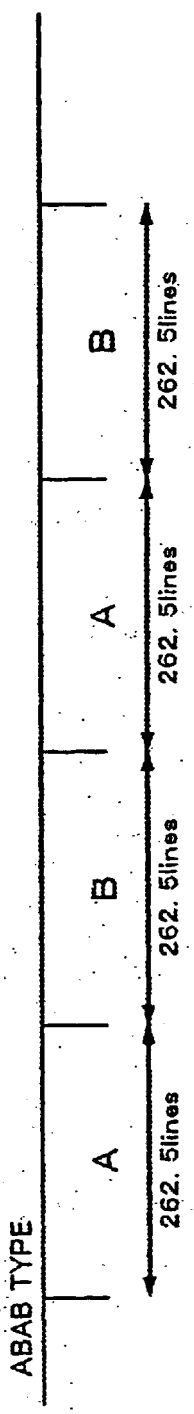
Figure 4C:
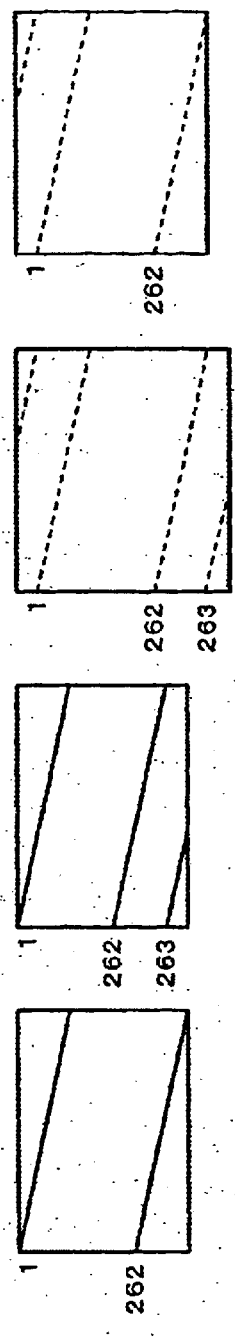
Figure 4D:
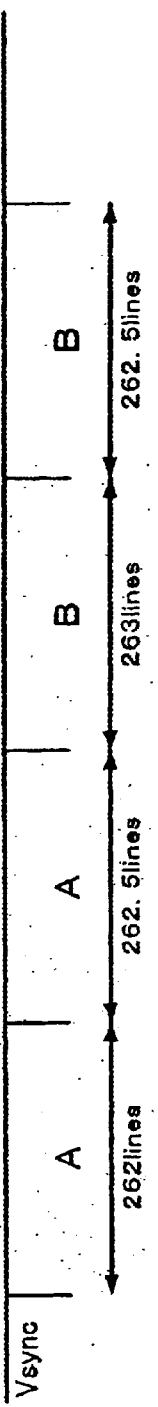

When the output picture signal is of AABB type, the signal is raster-scanned at physical positions as shown in FIG. 4C. In the first field, 262 lines from the first line to the 262-nd line are scanned. In the second field, the same positions as the first line to the 262-nd line of the first field are scanned. In addition, the first half of the 263-rd line is scanned. In other words, 262.5 lines are scanned. In the third field, 263 lines from the second half of the 263-rd line to the first half of the 263-rd line are scanned. In the fourth field, 262.5 lines from the second half of the 263-rd line to the 262-nd line are scanned. After the fourth field, the first field is scanned. Thus, at intervals of four fields, the output picture signal is raster-scanned. To the raster-scan the output picture signal as shown in FIG. 4C, the synchronous signal generating portion 9 generates a vertical synchronous signal as shown in FIG. 4D when the output picture signal is of AABB type.

The synchronous signal generating portion 9 generates a vertical synchronous signal corresponding to the type designated by the selection signal SL2 generated by the selection signal generating portion 8. The vertical synchronous signal causes the vertical deflection of the CRT monitor to be controlled so that a output picture signal having a field double speed is displayed.

Figure 5:
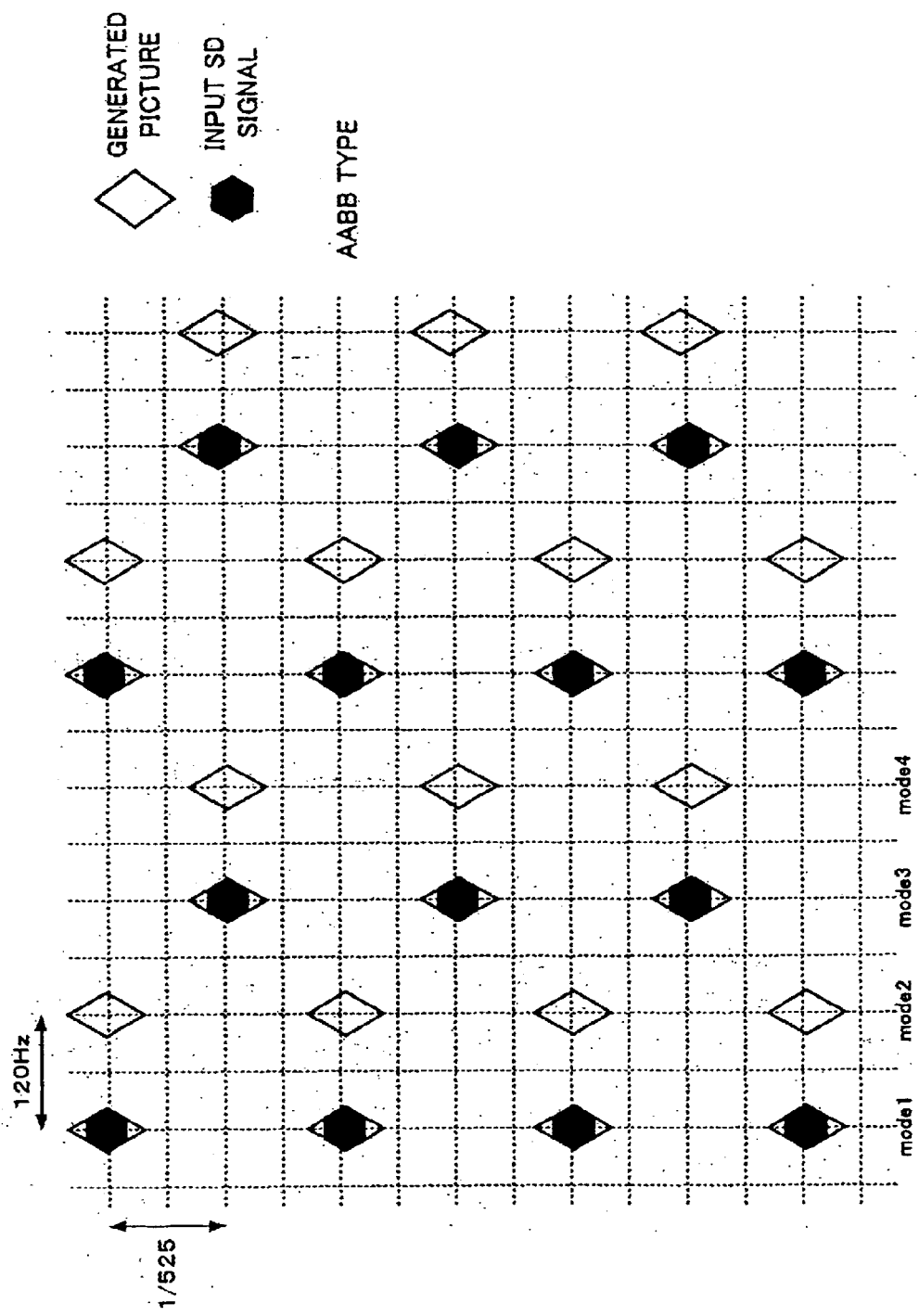
FIG. 5 is a schematic diagram showing an arrangement of pixels of an input picture signal and pixels of an output picture signal of AABB type.

Next, the class categorizing adaptive process according to the second embodiment will be described in detail. FIG. 5 shows positions of pixels as an output picture signal of AABB type. In FIG. 5, the vertical axis represents the vertical direction, whereas the horizontal axis represents the chronological direction. Pixels of a field that is present in an input picture signal are generated by the class categorizing adaptive process. In other words, the class detecting circuit 2, the predictive tap selecting circuit 3, the predictive coefficient memory 4, and the sum-of-product calculating circuit 5 generate pixels of a field that is not present in the input picture signal. The class detecting circuit 12, the predictive tap selecting circuit 13, the predictive coefficient memory 14, and the sum-of-product calculating circuit 15 generate pixels of a field that is not present in the input picture signal. The field doublers 6 and 16 and the selector 7 generate an output picture signal of AABB type of which pixels are arranged as shown in FIG. 5.

Figure 6:
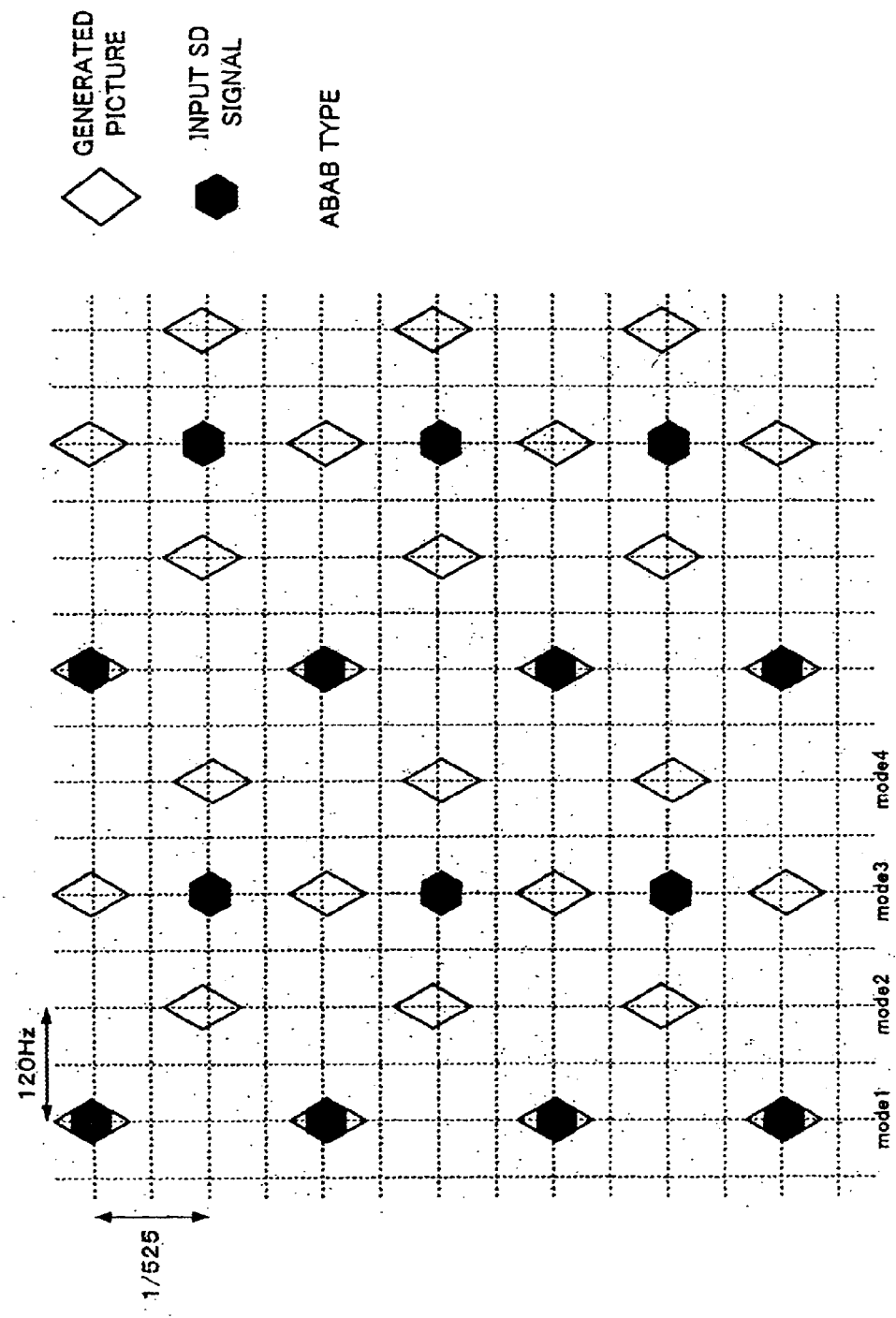
FIG. 6 is a schematic diagram showing an arrangement of pixels of an input picture signal and pixels of an output picture signal of ABAB type.

FIG. 6 shows positions of pixels as an output picture signal of ABAB type. In FIG. 6, the vertical axis represents the vertical direction, whereas the horizontal axis represents the chronological direction. The class detecting circuit 2, the predictive tap selecting circuit 3, the predictive coefficient memory 4, and the sum-of-product calculating circuit 5 generate pixels of a field that is present in an input picture signal. The class detecting circuit 12, the predictive tap selecting circuit 13, the predictive coefficient memory 14, and the sum-of-product calculating circuit 15 generate pixels of a field that is not present in the input picture signal. The field doublers 6 and 16 and the selector 7 generate an output signal of ABAB type of which pixels shown in FIG. 6 are arranged.

Next, a tap structure of which the output picture signal of AABB type shown in FIG. 5 is generated will be described. FIG. 7 shows a tap structure in the vertical direction and the chronological direction. For simple description, four modes are defined corresponding to similarities of a pixel generating operation. In the mode 1, a pixel that is contained in one of an odd field and an even field of an input picture signal and that is placed at the same vertical position as the pixel is generated as a pixel of the first field. In the mode 2, a pixel that is contained in a field that is not present in an input picture signal and that is placed at the same vertical position as a pixel of one field is generated as a pixel of the second field. In the mode 3, a pixel that is contained in the other field of an even field and an odd field of an input picture signal and that is placed at the same vertical position as a pixel of the other field is generated as a pixel of the third field. In the mode 4, a pixel that is contained in a field that is not present in an input picture signal and that is placed at the same vertical position as a pixel of the other field is generated as a pixel of the fourth field.

In the mode 2 and the mode 4 of which an output picture signal of AABB type is generated, in FIG. 7, as represented as a triangle area, input pixels of the early field and the late field of a newly generated field are used as class taps or predictive taps. In other words, a pixel that is contained in the early field of the newly generated field (the early field is referred to as −first field) and that is placed in the same position ss a pixel to be generated and pixels that are contained in the late field of the newly generated field (the late field is referred to as 0-th field) and that are placed at the vertically upper and lower positions of the pixel to be generated are used as taps.

FIG. 8A shows an example of predictive taps in the mode 1 and the mode 3. FIG. 8B shows an example of class taps in the mode 1 and the mode 3. In FIGS. BA and 8B, the vertical axis represents a vertical arrangement of pixels, whereas the horizontal axis represent a horizontal arrangement of pixels. As shown in FIG. 8A, predictive taps are composed of six input pixels $x_0$ to $x_5$ that are contained in the −first field and that are placed at the vertically upper and lower positions of a pixel y (denoted by a black circle) to be generated and four input pixels $x_6$ to $x_9$ that are contained in the 0-th field and that are placed at adjacent positions (upper, lower, left, and right positions) of the pixel y to be generated. In other words, the predictive taps are composed of a total of 10 input pixels.

As shown in FIG. 8B, class taps of the mode 1 and the mode 3 are composed of four input pixels $X_0$ to $X_3$. The pixels $X_0$ and $X_1$ are contained in the –first field and placed at the vertically upper and lower positions of the pixel y to be generated. The pixels $X_2$ and $X_3$ are contained in the 0-th field and placed in the vertically upper and lower positions of the pixel y to be generated.

Figure 9A:
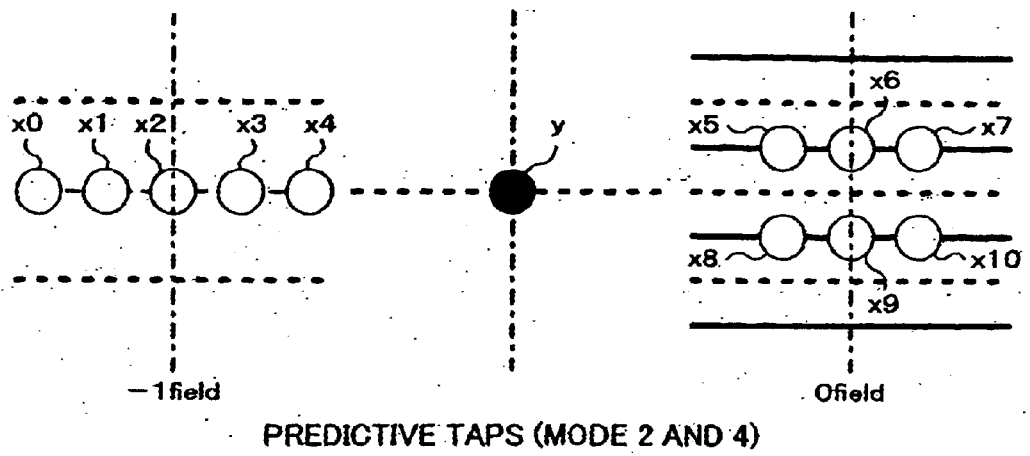
FIG. 9 is a schematic diagram showing an example of predictive taps and class taps of the AABB type.
Figure 9B:
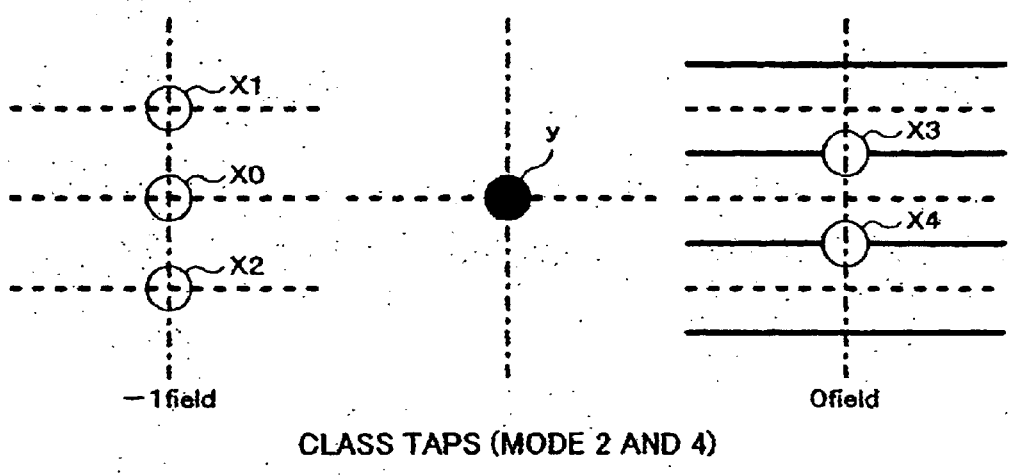

FIG. 9A shows an example of predictive taps in the mode 2 and the mode 4. FIG. 9B shows an example of class taps in the mode 2 and the mode 4. In FIGS. 9A and 9B, the vertical axis represents a vertical arrangement of pixels, whereas the horizontal axis represents a horizontal arrangement of pixels. As shown in FIG. 9A, predictive taps are composed of five input pixels $x_0$ to $X_4$ that are contained in the –first field and that are placed at the same vertical position as a pixel (black circle) y to be generated and six input pixels $x_5$ to $x_{10}$ that are contained in the 0-th field and that are placed at vertically upper and lower positions of the pixel y to be generated. In other words, predictive taps are composed of a total of 11 input pixels. The spatial position of the pixel y to be generated is the same as the spatial position of the input pixel x2.

As shown in FIG. 9B, class taps in the mode 2 and the mode 4 are composed of five input pixels $X_0$ to $X_4$. The input pixel $X_0$ is contained in the –first field and placed at the same spatial position as the pixel y to be generated. The input pixels $X_1$ and $X_2$ are contained in the –first field and placed at the vertically upper and lower positions of the pixel y to be generated. The pixels $X_3$ and $X_4$ are contained in the 0-th field and placed at the vertically upper and is lower positions of the pixel y to be generated.

Figure 10:
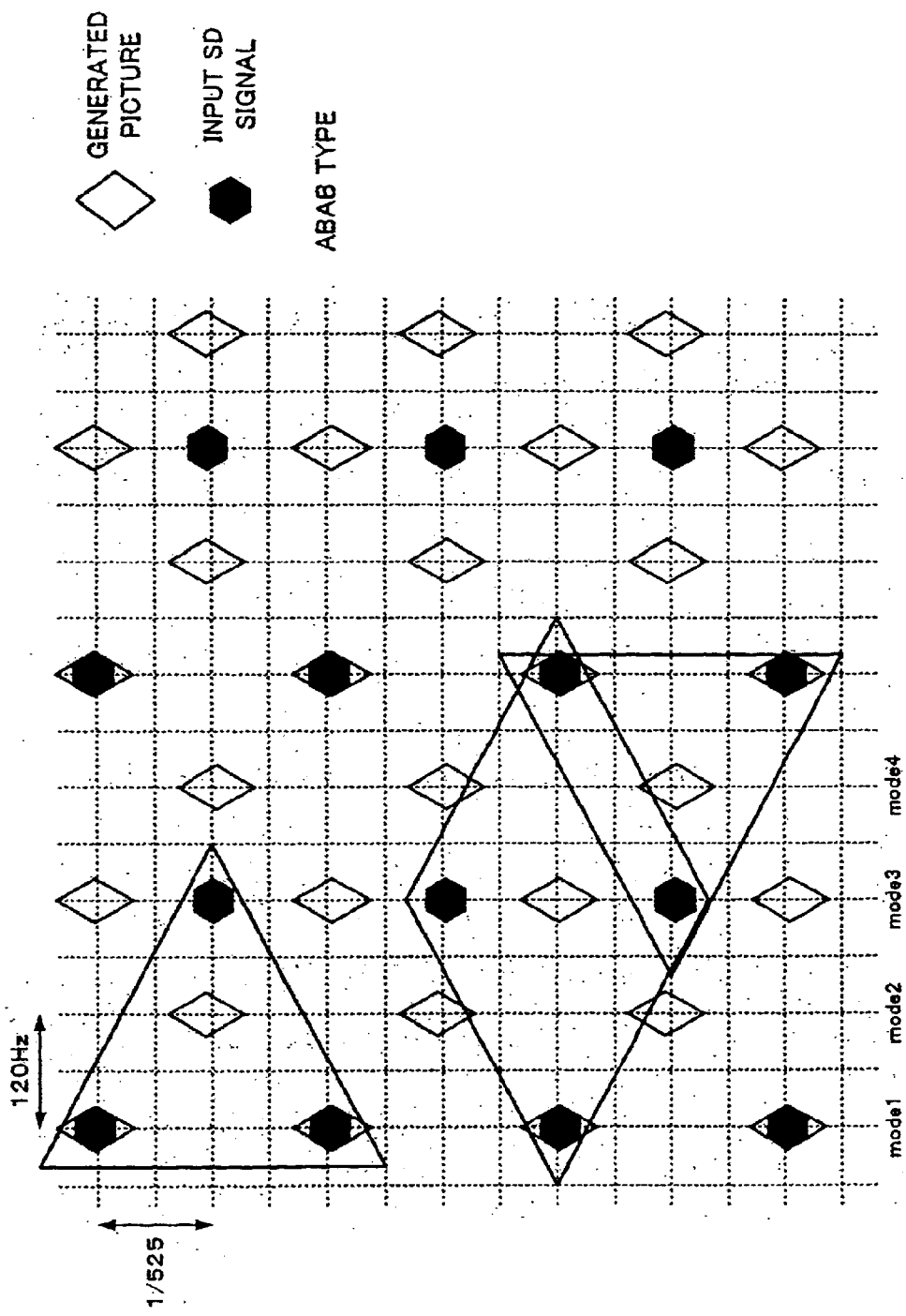
FIG. 10 is a schematic diagram showing the tap structure in the case that an output signal of ABAB type is generated.

Next, a tap structure in the case that an output picture signal of ABAB type shown in FIG. 6 is generated will be described. FIG. 10 shows a tap structure in the vertical direction and chronological direction. Corresponding to the similarities of process modes, four modes are defined. In the mode 1, a pixel is generated at the same vertical position as a pixel of one field that is present in an input picture signal. In the mode 2, a pixel of a field that is not present in an input picture signal and that is placed at a position that vertically deviates by 1/2 lines from a pixel of one field is generated. In the mode 3, a pixel is generated at a position that vertically deviates by 1/2 lines from a pixel of another field that is present in an input picture signal. In the mode 4, a pixel of a field that is not present in an input picture signal and that is placed at the same vertical position as a pixel of another field is generated.

In the mode 2 and the mode 4, in FIG. 10, as represented as a triangle area, input pixels of the immediately early field and the immediately late field of a new field that contains a pixel to be generated are used as taps. In the mode 2, pixels that are contained in the –first field and that are placed at the vertically upper and lower positions of a pixel to be generated and pixels that are contained in the 0-th field and that are placed at the vertically same position as the pixel to be generated are used as taps. In the mode 4, pixels that are contained in the –first field and that are placed in the same vertical position as a pixel to be generated and pixels that are contained in the 0-th field and that are placed at vertically upper and lower positions of the pixel to be generated are used as taps.

In the mode 3, as represented as a diamond area shown in FIG. 10, pixels that are contained in a field that contains a pixel to be generated (0-th field) and that are placed at the upper and lower positions of the pixel to be generated, a pixel that is contained in the immediately early field of the field of the pixel to be generated (–first field) and that is placed in the same vertical position as the pixel to be generated, and a pixel that is contained in the immediately late field of the new field (+first field) and that is placed at the same vertical position as the pixel to be generated are used as taps.

Figure 11A:
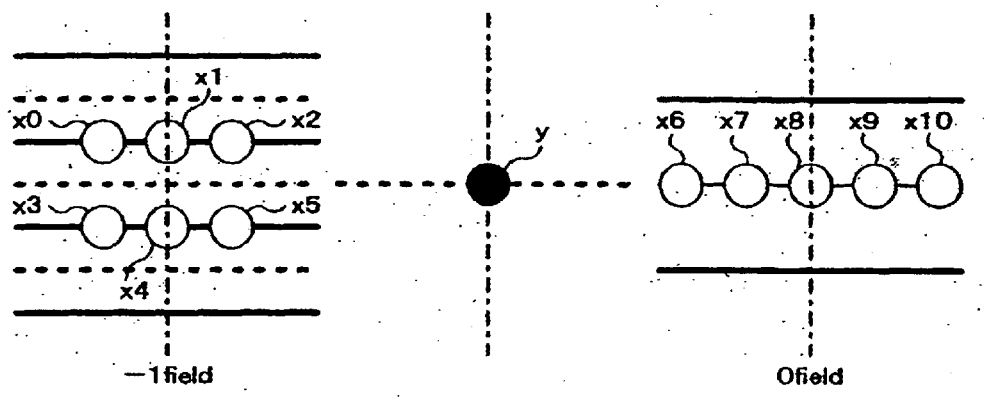
FIG. 11 is a schematic diagram showing an example of predictive taps and class taps of the ABAB type.
Figure 11B:
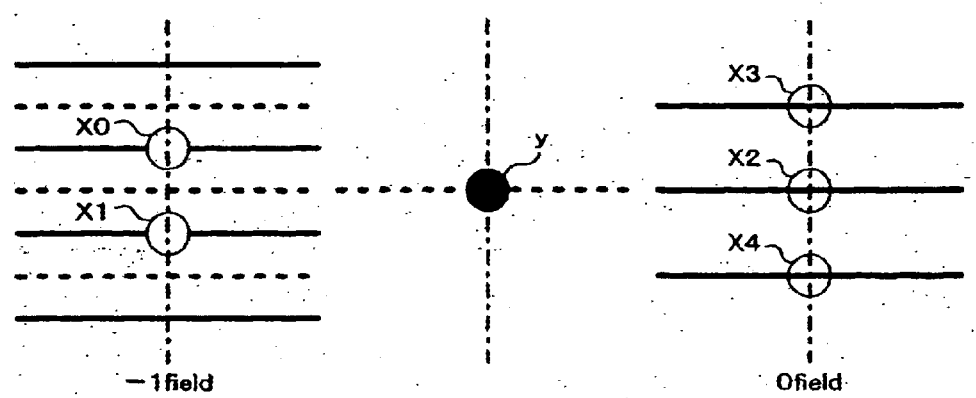

FIG. 11A shows an example of predictive taps in the mode 2. FIG. 11B shows an example of class taps in the mode 2. In FIGS. 11A and 11B, the vertical axis represents a vertical arrangement of pixels, whereas the horizontal axis represents a horizontal arrangement of pixels. As shown in FIG. 11A, predictive taps are composed of six input pixels $x_0$ to $X_5$ that are contained in the –first field and that are placed at the vertically upper and lower positions of the pixel y to be generated and five input pixels $x_6$ to $x_0$ that are contained in the 0-th field and that are placed at the same vertical position as the pixel y to be generated. In other words, predictive taps are composed of a total of 11 input pixels.

As shown in FIG. 11B, class taps in the mode 2 are composed of five input pixels $X_0$ to $X_4$. The pixels $X_0$ and $X_1$ are contained in the –first field and placed at the vertically upper and lower positions of the pixel y to be generated. The pixel $X_2$ is contained in the 0-th field and placed at the same position as the pixel y to be generated. The pixels $X_3$ and $X_4$ are contained in the 0-th field and placed at the vertically upper and lower positions of the pixel y to be generated.

Figure 12A:
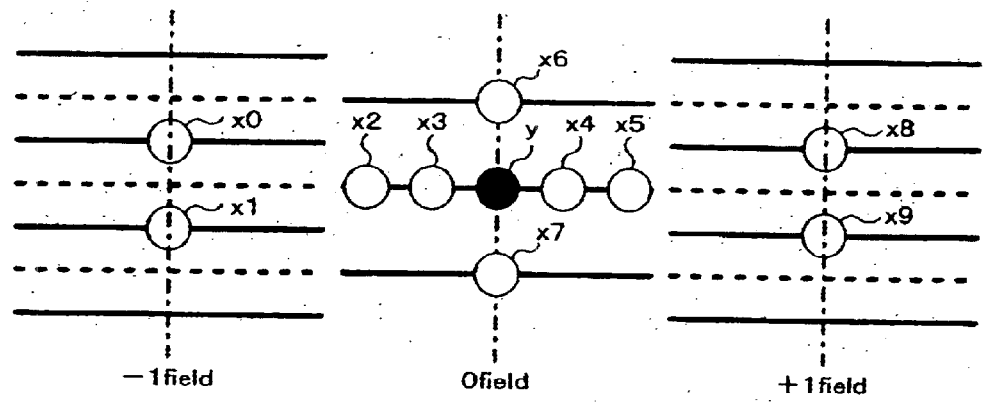
FIG. 12 is a schematic diagram showing an example of predictive taps and class taps of the ABAB type.
Figure 12B:
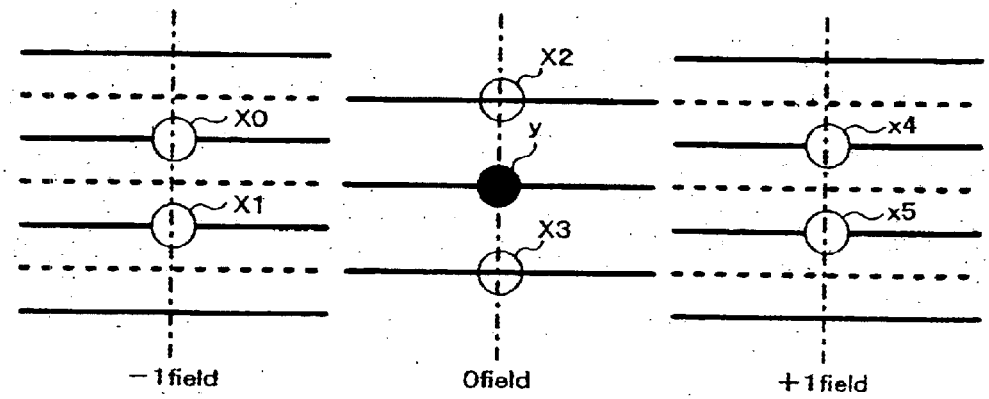

FIG. 12A shows an example of predictive taps in the mode 3. FIG. 12B shows an example of class taps in the mode 3. In FIGS. 12A and 12B, the vertical axis represents a vertical arrangement of pixels, whereas the horizontal axis represents a horizontal arrangement of pixels. As shown in FIG. 12A, predictive taps are composed of two input pixels $x_0$ and $x_1$ that are contained in the –first field and that are placed at the vertically upper and lower positions of the pixel y to be generated, six input pixels $x_2$ to $x_7$ that are contained in the 0-th field and that are placed at the adjacent positions of the pixel y to be generated, and two input pixels $x_8$ and $x_9$ that are contained in the +first field and that are placed at the vertically upper and lower positions of the pixel y to be generated. In other words, the predictive taps are composed of a total of ten input pixels.

As shown in FIG. 12B, class taps in the mode 3 are composed of six input pixels $X_0$ to $X_5$. The pixels $X_0$ and $X_1$ are contained in the –first field and placed at the vertically upper and lower positions of the pixel y to be generated. The pixels $X_2$ and $X_3$ are contained in the 0-th field and placed at the vertically upper and lower positions of the pixel y to be generated. The pixels $X_4$ and $X_5$ are contained in the +first field and placed at the vertically upper and lower positions of the pixel y to be generated.

Figure 13A:
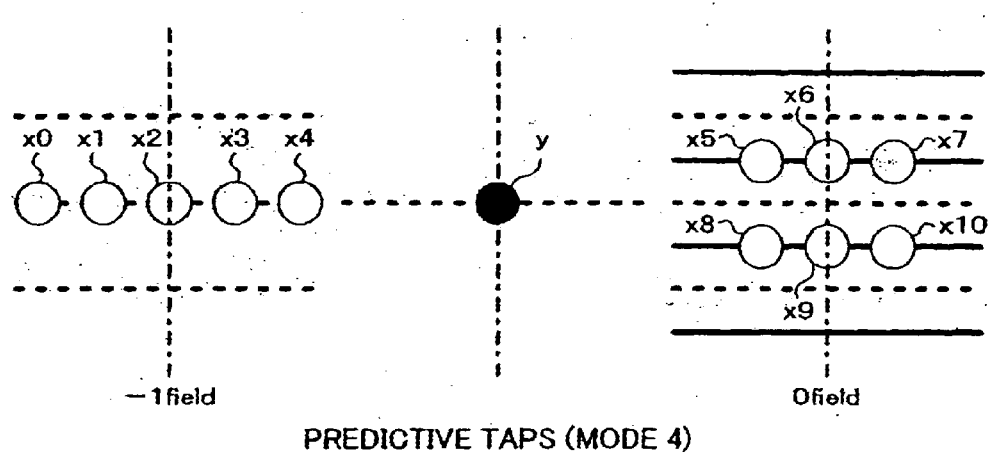
FIG. 13 is a schematic diagram showing another example of predictive taps and class taps of the ABAB type.
Figure 13B:
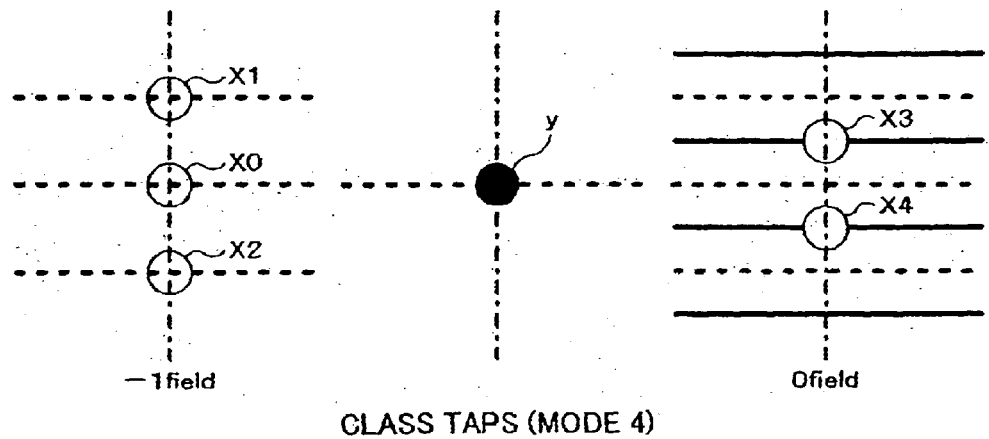

FIG. 13A shows an example of predictive taps in the mode 4. FIG. 13B shows an example of class taps of the mode 4. In FIGS. 13A and 13B, the vertical axis represents a vertical arrangement of pixels, whereas the horizontal axis represents a horizontal arrangement of pixels. As shown in FIG. 13A, predictive taps are composed of five input pixels $x_0$ to $X_4$ that are contained in the –first field and that are placed at the same vertical position as the pixel y to be generated and six input pixels $x_5$ to $x_{10}$ that are contained in the 0-th field and that are placed in the vertically upper and lower positions of the pixel y to be generated. In other words, the predictive taps are composed of a total of 11 input pixels.

As shown in FIG. 13B, class taps in the mode 4 are composed of five input pixels $X_0$ to $X_4$. The pixel $X_0$ is contained in the −first field and placed at the same vertical position as the pixel to be generated. The pixels $X_1$ and $X_2$ are contained in the −first field and placed at the vertically upper and lower positions of the pixel to be generated. The pixels $X_3$ and $X_4$ are contained in the 0-th field and placed at the vertically upper and lower positions of the pixel y to be generated.

The predictive taps and the class taps in the mode 1 may be the same as those used in a process of which fields that are present in an input signal are re-arranged (for example, these taps may be the same as those in the mode 1 of ABAB type shown in FIG. 8A).

The selection signal SL2 is supplied to the class detecting circuits 2 and 12 so as to switch class taps depending on whether the input picture signal is of AABB type or ABAB type. In addition, the selection signal SL2 is supplied to the predictive tap selecting circuits 3 and 13 so as to switch predictive taps depending on whether the input picture signal is of AABB type or ABAB type. Thus, the class taps and the predictive taps are switched depending on whether the input picture signal is of AABB type or ABAB type by the class detecting circuits 2 and 12 and the predictive tap selecting circuits 3 and 13, respectively. The area extracting portion 1 simultaneously outputs all input pixels that are expected to be used as class taps and predictive taps. The class detecting circuits 2 and 12 select class taps corresponding to the mode and the position of the considered pixel.

The class detecting circuits 2 and 12 detect features of class taps (for example, level distributions thereof). In this case, to prevent the number of classes from becoming large, a process for compressing input data of eight bits is performed so as to decrease the number of bits. For example, data of input pixels as class taps is compressed corresponding to ADRC (Adaptive Dynamic Range Coding) method. Besides the ADRC method, another compressing method such as DPCM (predictive encoding) method, VQ (Vector Quantizing) method, or the like may be used.

Although the ADRC method is an adaptive re-quantizing method that was developed for a highly efficiently encoding process for a VTR (Video Tape Recorder), since a local feature of a signal level can be effectively represented with a short word length, in the example, the ADRC method is used to generate as class categorizing code. In the ADRC method, assuming that the dynamic range of class taps is denoted by DR, the number of bits assigned thereto is denoted by n, the data level of pixels of class taps is denoted by L, and a re-quantized code is denoted by Q, the region between the maximum value MAX and the minimum value MIN is equally divided by a designated bit length so as to perform a re-quantizing process using Expression (1).

$$DR=MAX-MIN+1$$

$$Q=\{(L-MIN+0.5) \times 2/DR\} \quad (1)$$

where { } represents a truncating operation.

A class may be detected along with a moving class. In this case, corresponding to a moving class, class taps may be switched.

The sum-of-product calculating circuits 5 and 15 generate pixel values by a liner combination of predictive taps (pixel values) selected by the predictive tap selecting circuits 3 and 13 and predictive coefficient sets that are read from the predictive coefficient memories 4 and 14. Besides the linear expression, pixel values may be generated by a high order estimating expression of secondary or higher order. In this case, the predictive coefficient memories 4 and 14 store a predictive coefficient table for use with the AABB type and a predictive coefficient table for use with the ABAB type. Each table contains a plurality of predictive coefficient sets corresponding to the mode and the classes detected by the class detecting circuits 2 and 12. Each table (predictive coefficients) is pre-obtained by a learning process (that will be described later).

The sum-of-product calculating circuit 5 calculates a linear combination expression (Expression (2)) of predictive taps (pixel values) x1, x2, ..., xi received from the predictive tap selecting circuit 3 or 13 and a predictive coefficient set $w_1, w_2, \ldots, w_i$ and obtains a pixel value in the mode 1 and the mode 3. Likewise, the sum-of-product calculating circuit 15 obtains a pixel value in the mode 2 and the mode 4.

$$L1=w_1 x1+w_2 x2+ \ldots +w_i xi \quad (2)$$

Predictive coefficient sets for individual classes are pre-learnt and pre-stored to the predictive coefficient memories 4 and 14. A calculation is performed corresponding to the input predictive taps and the predictive coefficient set that is read. Since output data is formed corresponding to input data, a picture signal with a field double speed of high quality can be output.

Figure 14:
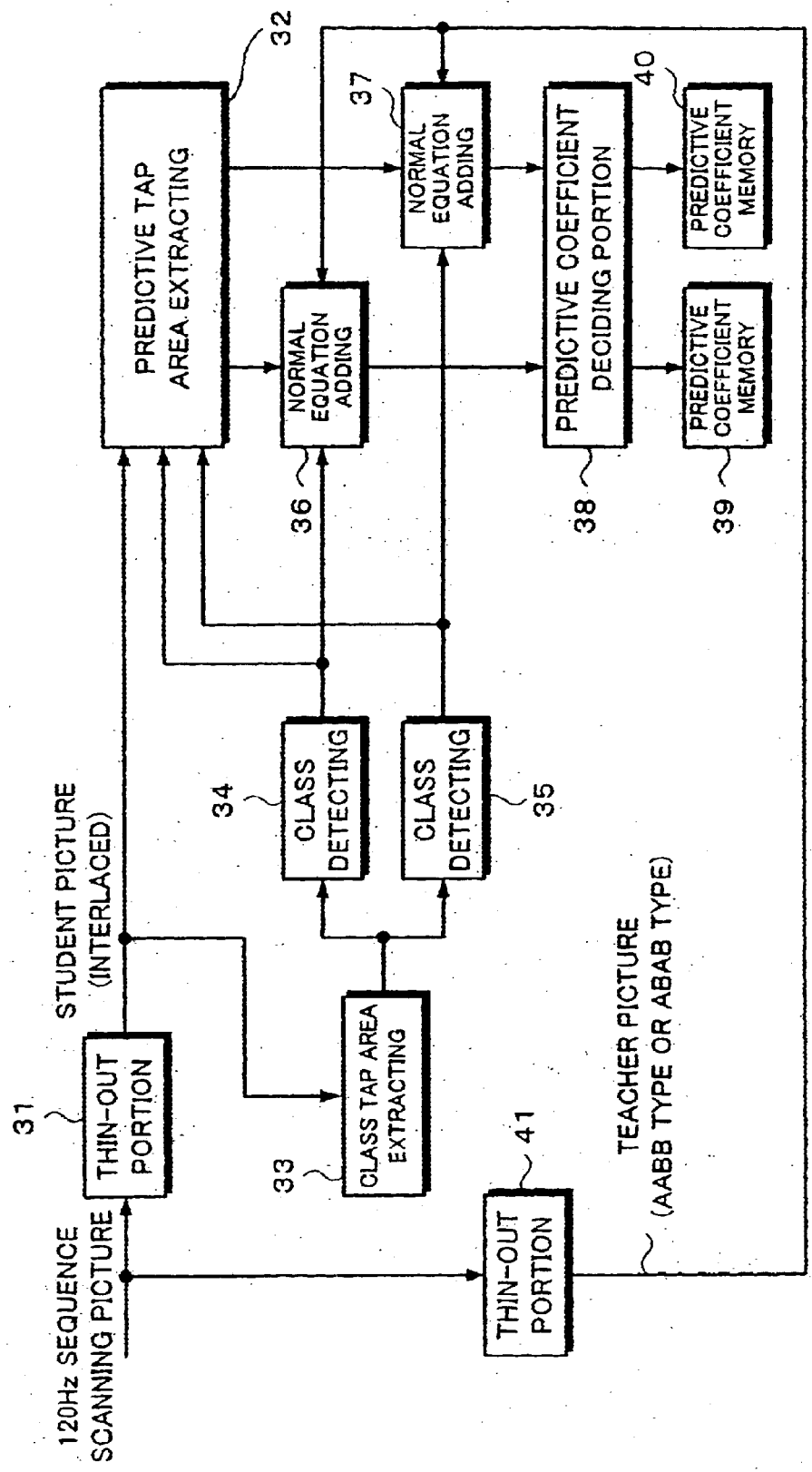
FIG. 14 is a block diagram showing the structure upon which predictive coefficients are learnt.

Next, with reference to FIG. 14, a process for generating (learning) predictive coefficients will be described. A learning process for generating an output picture signal of AABB type is different from a learning process for generating an output picture signal of ABAB type because they obtain different predictive coefficients. However, each of the learning processes can be accomplished by the structure shown in FIG. 14. To learn predictive coefficients, a thin-out portion 31 halves the number of pixels in the vertical direction of a progressive picture signal having a field frequency of 120 Hz (with a field double speed) and forms an interlaced picture signal (student picture) having a field frequency of 60 Hz.

In addition, a thin-out portion 41 halves the number of pixels in the vertical direction and forms a picture signal (teacher signal) having a field frequency of 120 Hz. The teacher signal is a signal of AABB type or ABAB type. The thin-out portion 41 varies the thin-out method in the vertical direction of each field and forms a teacher picture of AABB type or ABAB type. The teacher picture received from the thin-out portion 41 and the student picture received from the thin-out portion 31 are paired in the learning process.

Figure 15:
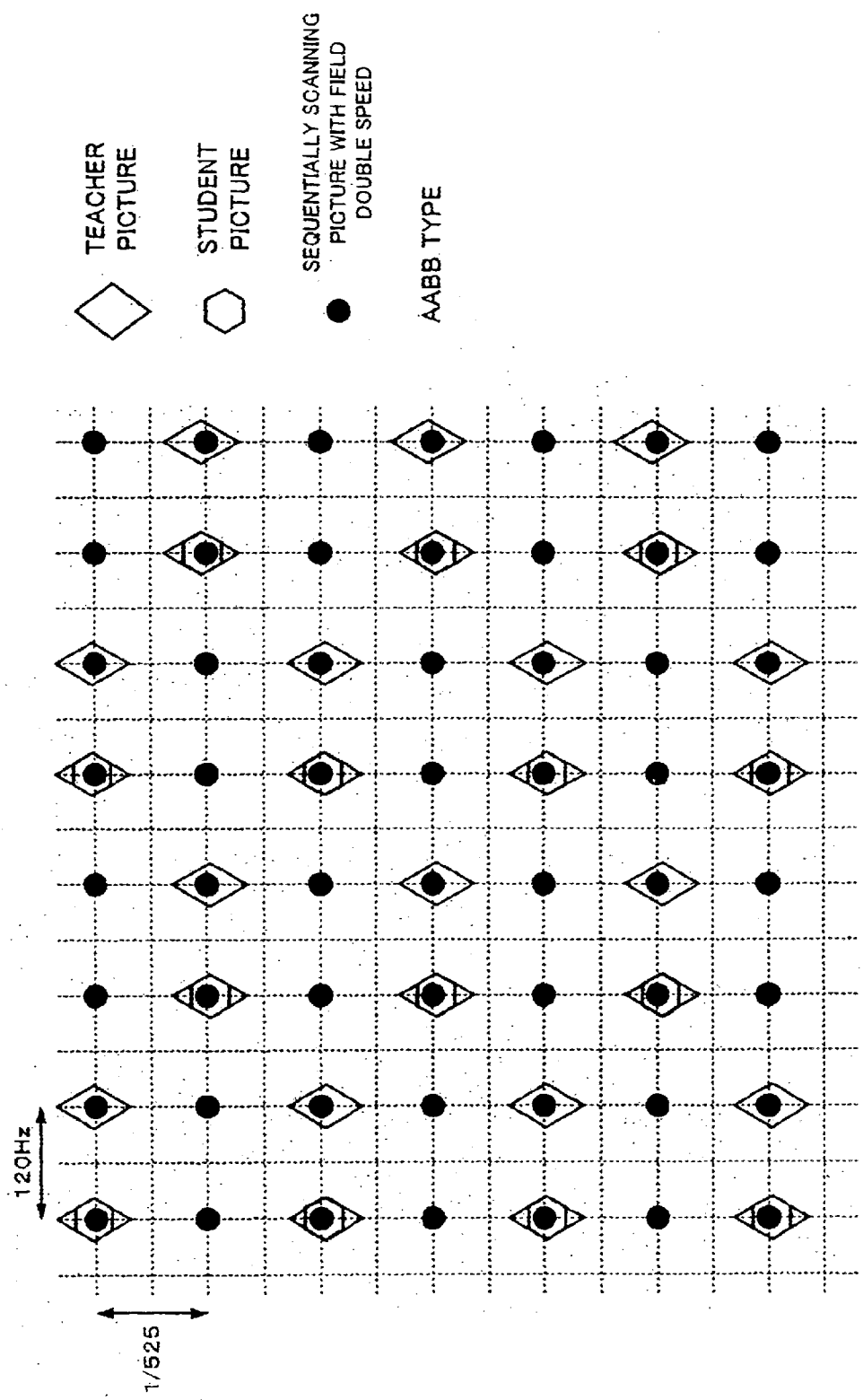
FIG. 15 is a schematic diagram for explaining the relation between positions of pixels of a teacher picture and pixels of a student picture upon which predictive coefficients of the AABB type are learnt.
Figure 16:
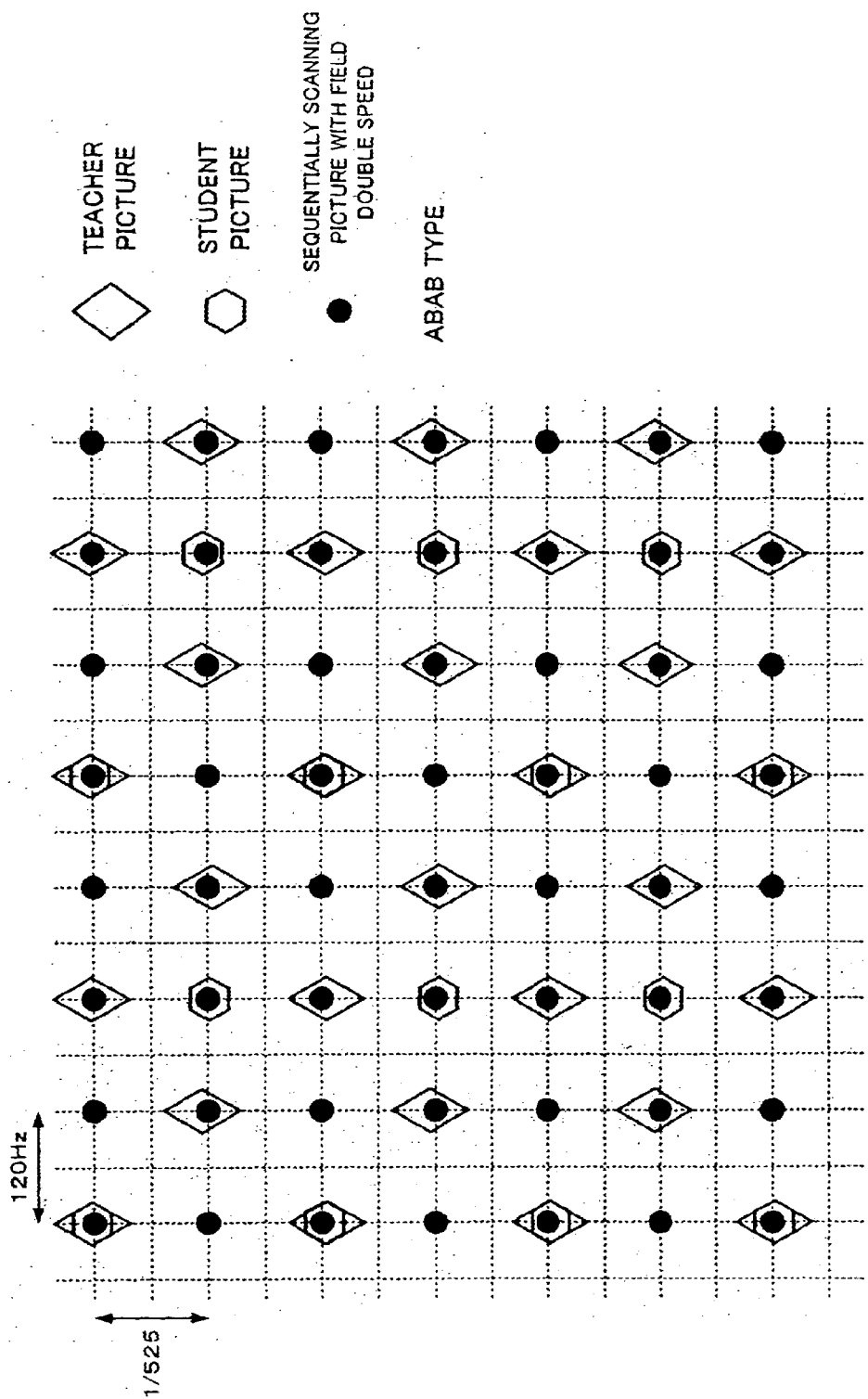
FIG. 16 is a schematic diagram for explaining the relation between positions of pixels of a teacher picture and pixels of a student picture upon which predictive coefficients of the ABAB type are learnt.

FIG. 15 shows a pixel structure in the case that predictive coefficients for forming an output picture signal of AABB type are learnt. FIG. 16 shows a pixel structure in the case that predictive coefficients for forming an output picture signal of ABAB type are learnt. In FIGS. 15 and 16, the vertical axis represents the vertical direction, whereas the horizontal axis represents the horizontal direction. In FIGS. 15 and 16, black circles represent pixels of a progressive picture having a field frequency of 120 Hz.

When predictive coefficients for the AABB type are learnt, the thin-out portion 41 thins out pixels by 1/2 in the vertical direction so that pixels at the same vertical positions in successive fields are treated as pixels of a teacher picture. When predictive coefficients for the ABAB type are learnt, the thin-out portion 41 thins out pixels by 1/2 in the vertical direction so that vertical positions of pixels of successive fields deviate by one line of the progressive picture. In addition, the thin-out portion 31 thins out pixels in the chronological direction so that the field frequency becomes 60 Hz. The thin-out portion 41 thins out pixels by 1/2 in the vertical direction so that the vertical position of chronologically successive fields deviates by one line of the progressive picture. The resultant student picture corresponds to an input picture when pixel values are generated.

The student picture signal is supplied from the thin-out portion 31 to both a predictive tap area extracting portion 32 and a class tap area extracting portion 33. Class taps are supplied from the class tap area extracting portion 33 to both class detecting circuits 34 and 35. The predictive tap area extracting portion 32 outputs predictive taps for generating a pixel in each mode. As with the class detecting circuits 2 and 12 of the pixel generating apparatus shown in FIG. 2, the class detecting circuits 34 and 35 compress data of class taps for each mode corresponding to the ADRC method and generate class information. The class detecting circuits 34 and 35 independently detect classes of the modes 1 and 3 and those of the classes 2 and 4, respectively.

Predictive taps are supplied from the predictive tap area extracting portion 32 to normal equation adding circuits 36 and 37. Next, the normal equation adding circuits 36 and 37 will be described as a learning process for learning a converting expression for converting a plurality of input pixels into an output pixel and a signal converting process using such a predicting expression. In the following description, an output pixel is predicted with n pixels as a general expression. Assuming that levels of input pixels selected as predictive taps are denoted by $x_1, \ldots, x_n$ and a level of an output pixel of a teacher picture is denoted by y, an n-tap linear estimating expression with a predictive coefficient set $w_1, \ldots, w_1$ for each class is defined as Expression (3). Before predictive taps are learnt, wi is an indeterminate coefficient.

$$y = w_1 x_1 + w_2 x_2 + \ldots + w_n x_n \tag{3}$$

The learning process is performed for a plurality of pieces of signal data for each class. When the number of pieces of signal data is m, Expression (4) is obtained corresponding to Expression (3).

$$y_k = w_1 x_{k1} + w_2 x_{k2} + \ldots + w_n x_{kn} \tag{4}$$

(where k=1, 2, . . . , m)

In the case of m>n, since a predictive coefficient set $w_1, \ldots, w_n$ is not uniquely decided, elements of an error vector e are defined by Expression (5). A predictive coefficient set that minimizes Expression (6) is obtained (using so-called solution of method of least squares).

$$e_k = y_k - \{w_1 x_{k1} + w_2 x_{k2} + \ldots + w_n x_{kn}\} \tag{5}$$

(where k=1, 2, . . . , m)

$$e^2 = \sum_{k=0}^{m} e_k^2 \tag{6}$$

Now, partial differential coefficients with respect to $w_i$ of Expression (6) are obtained. To do that, each coefficient $w_i$ is obtained in such a manner that Expression (7) becomes '0'.

$$\frac{\partial e^2}{\partial w_i} = \sum_{k=0}^{m} 2\left(\frac{\partial e_k}{\partial w_i}\right) e_k = \sum_{k=0}^{m} 2 x_{ki} \cdot e_k \tag{7}$$

When $X_{ij}$ and $Y_i$ are defined as Expression (8) and Expression (9), respectively, Expression (7) can be given as Expression (10) using a matrix.

$$X_{ji} = \sum_{p=0}^{m} x_{pi} \cdot x_{pj} \tag{8}$$

$$Y_i = \sum_{k=0}^{} x_{ki} \cdot y_k \tag{9}$$

$$\begin{bmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{bmatrix} \begin{bmatrix} W_1 \\ W_2 \\ \ldots \\ W_n \end{bmatrix} = \begin{bmatrix} Y_1 \\ Y_2 \\ \ldots \\ Y_n \end{bmatrix} \tag{10}$$

This equation is generally referred to as normal equation. The normal equation adding circuits 36 and 37 shown in FIG. 14 perform adding operations of the normal equation using the class information supplied from the class detecting circuits 34 and 35, predictive taps supplied from the predictive tap area extracting portion 32, and pixels of the teacher picture.

After data of a sufficient number of frames necessary for learning predictive coefficients has been input, the normal equation adding circuits 36 and 37 output normal equation data to a predictive coefficient deciding portion 38. The predictive coefficient deciding portion 38 solves the normal equation with respect to $w_1$ using a conventional matrix solution such as sweep-out method and calculates a predictive coefficient set. The predictive coefficient deciding portion 38 writes the calculated predictive coefficient set to predictive coefficient memories 39 and 40.

As a result of the learning process, predictive coefficients that allow a considered pixel y of a field double speed signal to be estimated for each class are stored to the predictive coefficient memories 39 and 40. The predictive coefficients stored in the predictive coefficient memories 39 and 40 are loaded to the predictive coefficient memories 4 and 14 of the above-described picture converting apparatus.

The number of predictive taps that are output from the predictive tap area extracting portion 32 is larger than the number of predictive taps used in the pixel generating apparatus. Thus, the predictive coefficient deciding portion 38 obtains many predictive coefficient sets for each class. Predictive coefficients set having the largest absolute values is selected from the obtained predictive coefficient sets. The selected predictive coefficient sets are stored to addresses corresponding to individual classes of the predictive coefficient memories 39 and 40. Thus, predictive taps are selected for individual classes. Selection position information of predictive taps for individual classes is stored to memories (not shown). By such a predictive tap selecting process, predictive taps corresponding to individual classes can be selected.

In the above-described process, using a linear estimating expression, predictive coefficients for generating data of a picture having a field frequency of 120 Hz with an interlaced picture signal having a field frequency of 60 Hz are learnt.

When the picture converting apparatus according to the present invention is disposed between a display device such as a CRT display and an input signal source, the type of an output picture signal having a field double speed can be selected corresponding to the picture pattern of the input picture signal. Thus, a reproduction picture with high quality can be displayed.

According to the present invention, when the field speed is doubled and an output picture signal of AABB type is generated, a field that is not present in an input picture signal is generated with picture information of the immediately early field and the immediately late field. Thus, the generated field becomes picture information corresponding to the time thereof. As a result, when the same field as an input field is repeated, a problem of which a chronological resolution is absent can be solved. In addition, since the class categorizing adaptive process is used, the chronological and spatial resolutions can be improved.

In addition, according to the present invention, since an output picture signal of AABB type and an output picture signal of ABAB type can be selectively used as a pixel structure, a field double speed process corresponding to the picture pattern of the input picture signal can be performed. Thus, when characters are scrolled on a screen such as stock information, the AABB type is selected. As a result, characters can be clearly displayed. Otherwise, the ABAB type is selected. Thus, a picture having high chronological and spatial resolutions can be displayed.

It should be noted that the present invention is not limited to the above described embodiments. In other words, various modifications and applications of the present invention are available without departing from the spirit of the present invention. In the above described embodiments, a double speed process for doubling the field frequency from 60 Hz to 120 Hz was described. However, the present invention can be applied to a double speed process for doubling the field frequency from 50 Hz to 100 Hz. In addition, the field frequency of the input picture signal is not limited to 50 Hz and 60 Hz. In the above-described second embodiment, the field double speed process was described. However, according to the present invention, along with the field double speed process, a process for doubling the number of pixels in the horizontal direction and/or the vertical direction can be performed at the same time. Moreover, the present invention is not limited to the double speed process. Instead, a field frequency conversion may be performed at any ratio.

What is claimed is:

1. A picture converting apparatus for converting an input picture signal into an output picture signal, the pixel positon of a first field of the input picture signal being different from the pixel position of a second field thereof, the first field being adjacent to the second field, the field frequency of the output signal being N times higher than the field frequency of the input picture signal, where N is an integer that is 2 or larger, comprising:

a class deciding portion for designating each of all fields of the output picture signal that are not present in at least the input picture signal to a considered field and deciding a class for each considered pixel of each considered field according to a plurality of pixels of the input picture signal, the plurality of pixels being decided according to each considered pixel of the considered field;

a memory portion for storing pre-obtained predictive information;

a predictive pixel selecting portion for selecting a plurality of pixels of the input picture signal for each considered pixel; and a pixel generating portion for generating each considered pixel of the output picture signal according to predictive information for a class decided by said class deciding portion and a plurality of pixels selected by said predictive pixel selecting portion, wherein the pixel position of the output picture signal varies at intervals of fields equal to N, and wherein the pixel position of each field matches the pixel position of the first field or the second field of the input picture signal.

2. The picture converting apparatus as set forth in claim 1, wherein the vertical pixel position of the first field of the input picture signal is different from the vertical pixel position of the second field thereof.

3. The picture converting apparatus as set forth in claim 2, wherein the vertical pixel position of the first field of the input picture signal deviates by 1/2 lines from the vertical pixel position of the second field thereof.

4. The picture converting apparatus as set forth in claim 1, wherein the pixel positions of N fields starting from a field chronologically matching a predetermined field of the input picture signal match the pixel position of a predetermined field of the input picture signal.

5. The picture converting apparatus as set forth in claim 1, wherein said class deciding portion successively decides each of all fields of the output picture signal as the considered field.

6. The picture converting apparatus as set forth in claim 1, wherein N is 2.

7. The picture converting apparatus as set forth in claim 1, wherein said pixel generating portion calculates a linear estimating expression of the predictive information corresponding to a class decided by said class deciding portion and a plurality of pixels selected by said predictive pixel selecting portion so as to generate each considered pixel of the output picture signal.

8. The picture converting apparatus as set forth in claim 1, wherein the input picture signal is an interlaced signal.

9. The picture converting apparatus as set forth in claim 1, wherein said memory portion stores predictive information corresponding to a first conversion mode and a second conversion mode, wherein in the first conversion mode, said pixel generating portion generates each considered pixel of the output picture signal according to a class decided by said class deciding portion, predictive information corresponding to the first mode, and a plurality of pixels selected by said predictive pixel selecting portion so as to generate an output picture signal of which the pixel position varies at intervals of fields equal to N and of which the pixel position of each field matches the pixel position of one of the first field and the second field of the input picture signal; and wherein in the second conversion mode, said pixel generating portion generates each considered pixel of the output picture signal according to a class decided by said class deciding portion, predictive information corresponding to the second mode, and a plurality of pixels selected by said predictive pixel selecting portion so as to generate an output picture signal of which the pixel position varies for each field and of which the pixel position of each field matches the pixel position of one of the first field and the second field of the input picture signal.

10. The picture converting apparatus as set forth in claim 9,
wherein the plurality of pixels of the input picture signal decided according to the considered pixel by said class deciding portion in the first mode are different from the plurality of pixels of the input picture signal decided according to the considered pixel by said class deciding portion in the second mode.

11. The picture converting apparatus as set forth in claim 9,
wherein said predictive pixel selecting portion selects a plurality of pixels from the input picture signal for each considered pixel in such a manner that the plurality of pixels selected from the input picture signal in the first mode are different from the plurality of pixels selected from the input picture signal in the second mode.

12. The picture converting apparatus as set forth in claim 9, further comprising:
a synchronous signal generating portion for selectively generating a synchronous signal corresponding to the first mode and a synchronous signal corresponding to the second mode.

13. A picture converting method for converting an input picture signal into an output picture signal, the pixel positon of a first field of the input picture signal being different from the pixel position of a second field thereof, the first field being adjacent to the second field, the field frequency of the output signal being N times higher than the field frequency of the input picture signal, where N is an integer that is 2 or larger, comprising the steps of:
designating each of all fields of the output picture signal that are not present in at least the input picture signal to a considered field and deciding a class for each considered pixel of each considered field according to a plurality of pixels of the input picture signal, the plurality of pixels being decided according to each considered pixel of the considered field;
selecting a plurality of pixels of the input picture signal for each considered pixel; and
generating each considered pixel of the output picture signal according to predictive information for a class decided at the class deciding step and a plurality of pixels selected at the predictive pixel selecting step,
wherein the pixel position of the output picture signal varies at intervals of fields equal to N, and
wherein the pixel position of each field matches the pixel position of the first field or the second field of the input picture signal.

14. The picture converting method as set forth in claim 13, wherein the vertical pixel position of the first field of the input picture signal is different from the vertical pixel position of the second field thereof.

15. The picture converting method as set forth in claim 14, wherein the vertical pixel position of the first field of the input picture signal deviates by 1/2 lines from the vertical pixel position of the second field thereof.

16. The picture converting method as set forth in claim 13, wherein the pixel positions of N fields starting from a field chronologically matching a predetermined field of the input picture signal match the pixel position of a predetermined field of the input picture signal.

17. The picture converting method as set forth in claim 13, wherein the class deciding step is performed by successively deciding each of all fields of the output picture signal as the considered field.

18. The picture converting method as set forth in claim 13, wherein N is 2.

19. The picture converting method as set forth in claim 13, wherein the pixel generating step is performed by calculating a linear estimating expression of the predictive information corresponding to a class decided at the step class deciding step and a plurality of pixels selected at the predictive pixel selecting step so as to generate each considered pixel of the output picture signal.

20. The picture converting method as set forth in claim 13, wherein the input picture signal is an interlaced signal.

21. The picture converting method as set forth in claim 13,
wherein in the first conversion mode, the pixel generating step is performed by generating each considered pixel of the output picture signal according to a class decided at the class deciding step, predictive information corresponding to the first mode, and a plurality of pixels selected at the predictive pixel selecting step so as to generate an output picture signal of which the pixel position varies at intervals of fields equal to N and of which the pixel position of each field matches the pixel position of one of the first field and the second field of the input picture signal; and
wherein in the second conversion mode, the pixel generating step is performed by generating each considered pixel of the output picture signal according to a class decided at the class deciding step, predictive information corresponding to the second mode, and a plurality of pixels selected at the predictive pixel selecting step so as to generate an output picture signal of which the pixel position varies for each field and of which the pixel position of each field matches the pixel position of one of the first field and the second field of the input picture signal.

22. The picture converting method as set forth in claim 21,
wherein the plurality of pixels of the input picture signal decided according to the considered pixel at the class deciding step in the first mode are different from the plurality of pixels of the input picture signal decided according to the considered pixel at the class deciding step in the second mode.

23. The picture converting method as set forth in claim 21,
wherein the predictive pixel selecting step is performed by selecting a plurality of pixels from the input picture signal for each considered pixel in such a manner that the plurality of pixels selected from the input picture signal in the first mode are different from the plurality of pixels selected from the input picture signal in the second mode.

24. The picture converting method as set forth in claim 21, further comprising the step of:
selectively generating a synchronous signal corresponding to the first mode and a synchronous signal corresponding to the second mode.

* * * * *